(12) United States Patent
Kooken et al.

(10) Patent No.: US 9,647,555 B2
(45) Date of Patent: *May 9, 2017

(54) CHOPPER OUTPUT STAGE FOR ARC WELDER POWER SOURCE

(75) Inventors: Todd E. Kooken, University Hts., OH (US); Theresa Chih-Lei Miao Spear, Highland Hts., OH (US)

(73) Assignee: LINCOLN GLOBAL, INC., Monterey Park, CA (US)

( * ) Notice: Subject to any disclaimer, the term of this patent is extended or adjusted under 35 U.S.C. 154(b) by 2557 days.

This patent is subject to a terminal disclaimer.

(21) Appl. No.: 11/102,429

(22) Filed: Apr. 8, 2005

(65) Prior Publication Data

US 2006/0226130 A1    Oct. 12, 2006

(51) Int. Cl.
| | |
|---|---|
| *B23K 9/10* | (2006.01) |
| *H02M 5/42* | (2006.01) |
| *H02M 3/158* | (2006.01) |
| *H02M 1/42* | (2007.01) |
| *H02M 3/337* | (2006.01) |
| *H02M 1/00* | (2006.01) |

(52) U.S. Cl.
CPC ......... *H02M 3/1584* (2013.01); *B23K 9/1056* (2013.01); *H02M 1/4225* (2013.01); *H02M 3/337* (2013.01); *H02M 2001/007* (2013.01); *H02M 2001/0064* (2013.01); *Y02P 70/181* (2015.11)

(58) Field of Classification Search
CPC .............. B23K 9/1056; H02M 1/4225; H02M 2001/0064; H02M 2001/007; H02M 3/1584; H02M 3/337; Y02P 70/181

USPC ........ 219/130.1, 130.21, 130.5, 130.51, 136, 219/121.36, 121.39, 121.45; 363/13, 142, 363/74, 78, 84, 89, 15, 16, 17, 21.12, 363/21.14, 21.18, 20, 21.01, 95, 97, 131
See application file for complete search history.

(56) References Cited

U.S. PATENT DOCUMENTS

| | | | |
|---|---|---|---|
| 3,459,920 | A | 8/1969 | Sevenco |
| 3,737,755 | A | 6/1973 | Calkin et al. |
| 3,809,853 | A | 5/1974 | Manz |
| 3,904,846 | A | 9/1975 | Risberg |
| 3,984,799 | A | 10/1976 | Fletcher et al. |
| 4,020,320 | A | 4/1977 | Pijls et al. |
| 4,020,361 | A | 4/1977 | Suelzle et al. |
| 4,049,946 | A | 9/1977 | Fluckiger et al. |
| 4,125,759 | A | 11/1978 | Kiyohara et al. |

(Continued)

FOREIGN PATENT DOCUMENTS

| | | |
|---|---|---|
| AU | 2005237114 | 11/2005 |
| BR | PI 0505417-6 | 12/2006 |

(Continued)

OTHER PUBLICATIONS

EP Search Report, EP 05 02 5646, Jan. 23, 2008, Enguerran Despis.

(Continued)

*Primary Examiner* — Dana Ross
*Assistant Examiner* — Ket D Dang
(74) *Attorney, Agent, or Firm* — Perkins Coie LLP

(57) ABSTRACT

Power sources are disclosed for electric arc welding or cutting processes, in which an interleaved multiphase switching converter is provided with a plurality of converter power circuits to convert a DC signal to a regulated signal suitable for welding.

52 Claims, 10 Drawing Sheets

(56) References Cited

U.S. PATENT DOCUMENTS

| | | | |
|---|---|---|---|
| 4,201,906 A | 5/1980 | Puschner | |
| 4,245,285 A | 1/1981 | Weiss | |
| 4,403,269 A | 9/1983 | Carroll | |
| 4,409,465 A | 10/1983 | Yamamoto et al. | |
| 4,425,613 A | 1/1984 | Shelly et al. | |
| 4,433,370 A | 2/1984 | Karadsheh et al. | |
| 4,442,339 A | 4/1984 | Mizuno et al. | |
| 4,442,370 A | 4/1984 | Veyssiere | |
| 4,447,695 A | 5/1984 | Inoue | |
| 4,485,293 A | 11/1984 | Tabata et al. | |
| 4,494,180 A | 1/1985 | Streater et al. | |
| 4,503,316 A | 3/1985 | Murase et al. | |
| 4,518,844 A | 5/1985 | Needham | |
| 4,521,671 A | 6/1985 | Fronius | |
| 4,521,672 A | 6/1985 | Fronius | |
| 4,533,986 A | 8/1985 | Jones | |
| 4,540,892 A | 9/1985 | Carvalho | |
| 4,546,234 A | 10/1985 | Ogasawara et al. | |
| 4,564,742 A | 1/1986 | Karlsson et al. | |
| 4,618,919 A | 10/1986 | Martin, Jr. | |
| 4,635,181 A | 1/1987 | Bourgeault | |
| 4,677,366 A | 6/1987 | Wilkinson et al. | |
| 4,677,667 A | 6/1987 | Burns | |
| 4,720,667 A | 1/1988 | Lee et al. | |
| 4,720,668 A | 1/1988 | Lee et al. | |
| 4,748,397 A | 5/1988 | Ogawa et al. | |
| 4,779,184 A | 10/1988 | White | |
| 4,855,888 A | 8/1989 | Henze et al. | |
| 4,857,822 A | 8/1989 | Tabosz et al. | |
| 4,864,479 A | 9/1989 | Steigerwald et al. | |
| 4,866,247 A | 9/1989 | Parks | |
| 4,889,969 A | 12/1989 | Kawai et al. | |
| 4,904,843 A | 2/1990 | Hori et al. | |
| 4,924,170 A | 5/1990 | Henze | |
| 4,963,715 A | 10/1990 | Tuttle | |
| 4,964,026 A | 10/1990 | Locascio | |
| 5,001,326 A | 3/1991 | Stava | |
| 5,001,623 A | 3/1991 | Magid | |
| 5,008,795 A | 4/1991 | Parsley et al. | |
| 5,019,952 A | 5/1991 | Smolenski et al. | |
| 5,066,900 A | 11/1991 | Bassett | |
| 5,130,561 A | 7/1992 | Elliott et al. | |
| 5,149,933 A | 9/1992 | Donner | |
| 5,172,309 A | 12/1992 | DeDoncker et al. | |
| 5,220,151 A | 6/1993 | Terayama et al. | |
| 5,225,660 A * | 7/1993 | Mita et al. | 219/130.51 |
| 5,235,504 A | 8/1993 | Sood | |
| 5,245,525 A | 9/1993 | Galloway et al. | |
| 5,272,313 A | 12/1993 | Karino et al. | |
| 5,278,390 A | 1/1994 | Blankenship | |
| 5,319,533 A | 6/1994 | Reynolds et al. | |
| 5,321,348 A | 6/1994 | Vinciarelli et al. | |
| 5,343,017 A | 8/1994 | Karino | |
| 5,343,140 A | 8/1994 | Gegner | |
| 5,349,149 A | 9/1994 | Shiraki et al. | |
| 5,349,157 A | 9/1994 | Blankenship | |
| 5,349,159 A | 9/1994 | Mita et al. | |
| 5,351,175 A | 9/1994 | Blankenship | |
| 5,367,448 A | 11/1994 | Carroll | |
| 5,402,060 A | 3/1995 | Erisman | |
| 5,406,051 A | 4/1995 | Lai | |
| 5,414,238 A | 5/1995 | Steigerwald et al. | |
| 5,414,613 A | 5/1995 | Chen | |
| 5,418,704 A | 5/1995 | Hua et al. | |
| 5,434,768 A | 7/1995 | Jitaru et al. | |
| 5,440,179 A | 8/1995 | Severinsky | |
| 5,444,356 A | 8/1995 | Reynolds et al. | |
| 5,465,011 A | 11/1995 | Miller et al. | |
| 5,477,131 A | 12/1995 | Gegner | |
| 5,543,704 A | 8/1996 | Thoren | |
| 5,601,741 A | 2/1997 | Thommes | |
| 5,612,609 A | 3/1997 | Choi | |
| 5,615,095 A | 3/1997 | Reynolds et al. | |
| 5,615,098 A | 3/1997 | Ishii | |
| 5,636,114 A | 6/1997 | Bhagwat et al. | |
| 5,710,696 A | 1/1998 | Reynolds et al. | |
| 5,715,150 A | 2/1998 | Stava | |
| 5,747,972 A | 5/1998 | Baretich et al. | |
| 5,760,372 A | 6/1998 | Karino et al. | |
| 5,771,163 A | 6/1998 | Moriguchi et al. | |
| 5,777,860 A | 7/1998 | Halbert | |
| 5,786,992 A | 7/1998 | Vinciarelli | |
| 5,790,389 A * | 8/1998 | Hua | 363/20 |
| 5,796,595 A * | 8/1998 | Cross | 363/71 |
| 5,811,757 A | 9/1998 | Higgins | |
| 5,824,990 A | 10/1998 | Geissler | |
| 5,825,642 A | 10/1998 | Ishii et al. | |
| 5,831,240 A | 11/1998 | Katooka et al. | |
| 5,847,942 A * | 12/1998 | Bazinet et al. | 363/25 |
| 5,864,116 A | 1/1999 | Baker | |
| 5,867,374 A | 2/1999 | Moreau | |
| 5,874,826 A | 2/1999 | Chen et al. | |
| 5,875,104 A | 2/1999 | Prager | |
| 5,894,414 A | 4/1999 | Jiang | |
| 5,917,711 A | 6/1999 | Shikata et al. | |
| 5,926,381 A | 7/1999 | Moriguchi | |
| 5,990,445 A | 11/1999 | Ogasawara et al. | |
| 5,991,169 A | 11/1999 | Kooken | |
| 5,991,180 A | 11/1999 | Vogel et al. | |
| 6,023,037 A * | 2/2000 | Church et al. | 219/121.39 |
| 6,023,154 A | 2/2000 | Martinez | |
| 6,023,416 A | 2/2000 | Shikata et al. | |
| 6,031,737 A | 2/2000 | Green | |
| 6,051,804 A | 4/2000 | Reynolds et al. | |
| 6,051,806 A | 4/2000 | Shikata et al. | |
| 6,054,674 A | 4/2000 | Moriguchi et al. | |
| 6,055,161 A | 4/2000 | Church et al. | |
| 6,067,241 A | 5/2000 | Lu | |
| 6,069,801 A | 5/2000 | Hodge, Jr. et al. | |
| 6,069,811 A * | 5/2000 | Moriguchi et al. | 363/142 |
| 6,087,628 A | 7/2000 | Ferkel et al. | |
| 6,091,612 A | 7/2000 | Blankenship | |
| 6,101,105 A | 8/2000 | Gilmore | |
| 6,115,273 A | 9/2000 | Geissler | |
| 6,177,645 B1 | 1/2001 | Church et al. | |
| 6,188,585 B1 | 2/2001 | Ikeda et al. | |
| 6,198,642 B1 | 3/2001 | Kociecki | |
| 6,207,927 B1 | 3/2001 | Mita et al. | |
| 6,207,929 B1 | 3/2001 | Stava et al. | |
| 6,211,657 B1 * | 4/2001 | Goluszek | 323/272 |
| 6,236,014 B1 | 5/2001 | Ulrich | |
| 6,268,587 B1 | 7/2001 | Kooken et al. | |
| 6,278,080 B1 | 8/2001 | Moriguchi et al. | |
| 6,291,798 B1 | 9/2001 | Stava | |
| 6,300,589 B1 * | 10/2001 | Reynolds et al. | 219/121.39 |
| 6,329,636 B1 | 12/2001 | Geissler | |
| 6,331,694 B1 | 12/2001 | Blankenship | |
| 6,349,044 B1 | 2/2002 | Canales-Abarca et al. | |
| 6,353,547 B1 | 3/2002 | Jang et al. | |
| 6,365,874 B1 | 4/2002 | Stava | |
| 6,384,373 B1 | 5/2002 | Schwartz | |
| 6,469,921 B2 | 10/2002 | Arai et al. | |
| 6,472,634 B1 | 10/2002 | Houston et al. | |
| 6,483,687 B2 | 11/2002 | Katooka et al. | |
| 6,501,049 B2 | 12/2002 | Stava | |
| 6,504,132 B1 | 1/2003 | Church | |
| 6,570,128 B1 | 5/2003 | Mela | |
| 6,570,130 B1 | 5/2003 | Kooken et al. | |
| 6,600,134 B2 | 7/2003 | Stava | |
| 6,618,274 B2 | 9/2003 | Boylan et al. | |
| 6,653,595 B2 | 11/2003 | Hutchinson et al. | |
| 6,660,966 B2 | 12/2003 | Houston et al. | |
| 6,665,183 B1 | 12/2003 | Shikata et al. | |
| 6,683,278 B2 | 1/2004 | Stava | |
| 6,710,299 B2 | 3/2004 | Blankenship et al. | |
| 6,713,721 B2 | 3/2004 | Albrecht | |
| 6,717,107 B1 | 4/2004 | Hsu | |
| 6,723,957 B2 | 4/2004 | Holverson et al. | |
| 6,750,637 B2 * | 6/2004 | Nagaki et al. | 323/272 |
| 6,815,639 B2 | 11/2004 | Geissler | |
| 6,864,479 B1 | 3/2005 | Davis et al. | |
| 8,269,141 B2 * | 9/2012 | Daniel et al. | 219/130.1 |
| 2002/0125235 A1 | 9/2002 | Stava | |
| 2002/0191425 A1 | 12/2002 | Geissler | |

(56) References Cited

U.S. PATENT DOCUMENTS

| | | | |
|---|---|---|---|
| 2003/0111451 | A1 | 6/2003 | Blankenship et al. |
| 2006/0011595 | A1* | 1/2006 | Daniel et al. ............. 219/130.1 |
| 2006/0213890 | A1 | 9/2006 | Kooken et al. |
| 2006/0226130 | A1 | 10/2006 | Kooken et al. |
| 2006/0243716 | A1 | 11/2006 | Stava et al. |
| 2007/0051712 | A1 | 3/2007 | Kooken et al. |

FOREIGN PATENT DOCUMENTS

| | | |
|---|---|---|
| CN | 1064178 | 9/1992 |
| CN | 1324141 | 11/2001 |
| CN | ZL200610001578.4 | 3/2009 |
| EP | 0704957 B1 | 1/1999 |
| EP | 1 616 654 A1 | 1/2006 |
| EP | 1615654 A | 1/2006 |
| EP | 1 688 203 A2 | 8/2006 |
| EP | 1 704 854 A1 | 9/2006 |
| EP | 1 704 954 A1 | 9/2006 |
| EP | 1710897 | 8/2010 |
| GB | 2320627 A | 6/1998 |
| JP | 58-132368 | 8/1983 |
| JP | 61-296965 | 12/1986 |
| JP | 1-143767 A | 6/1989 |
| JP | 02041777 A | 2/1990 |
| JP | 3-004376 A | 1/1991 |
| JP | 09-271940 | 10/1997 |
| JP | 09-271940 A | 10/1997 |
| JP | 11-235040 | 8/1999 |
| JP | 11-235040 A | 8/1999 |
| JP | 2000-173794 | 6/2000 |
| JP | 2000-173794 A | 6/2000 |
| KR | 0671379 | 1/2007 |
| MX | 265521 | 3/2009 |
| TW | I309912 | 5/2009 |
| WO | WO 03/015973 | 2/2003 |
| WO | WO 03/015973 A | 2/2003 |

OTHER PUBLICATIONS

EP Search Report, EP 05 02 5646, Jan. 23, 2008.
EP Communication, 06 000 268.0-2302, Jan. 9, 2008.
Cho, "Novel Zero-Voltage-Transition PWM Multiphase Converters", IEEE transactions on power electronics, vol. 13, No. 1, Jan. 1998.
Huang, "A Scalable Multiphase Buck Converter with Average Current Share Bus", International Rectifier, 2003.
Schuellein, "Multiphase Converter Bucks Power", EE Times, Sep. 11, 2000.
Czogalla, "Automotive Application of Multi-Phase Coupled-Inductor DC-DC Converter", IAS 2003.
Wong, "Performance Improvements of Interleaved Converters", IAS 2003.
Zumel, "Magnetic Integration for Interleaved Converters", IEEE 2003.
Dixon, "Coupled Filter Inductors in Multi-Output Buck Regulators", Unitrode, Texas Instruments, 2003.
Shortt, "A 600 Watt Four Stage Phase-Shifted-Parallel DC-TO-Dc Converter".
Cheung "ISL6558EVAL1-Multi-Phase Power Conversion For Routers and PC Peripherals Up to 100A".
Wang "Carrier phase shifted SPWM based on current sourced multi-modular converter for active power filter,".
Ridley, "The Incredible Shrinking (unregulated) Power Supply".
European Search Report, EP 07 10 3523, Munnich, Jan. 30, 2008, Jeggy, Thierry.
European Search Report, EP 05 005216.
Ned Mohan, Tore M. Undeland and Ralph J. Ferraro, Sinusoidal Line Current Rectification with a 100 kHz B-Sit Step-Up Converter, 1984.
Phillip C. Todd—"Boost Power Factor Corrector Design with UC3853", Unitrode Corporation 1999.
Marty Brown, "Power Supply Cookbook", Copyright 1994 by Butterworth Heinemann.
Bob Mammano and Lloyd Dixon, "Choose the Optimum Topology for High power Factor-Supplies", Unitrode IC Corporation, PCIM, Mar. 1991.
Lloyd H. Dixon Jr., "High Power Factor Preregulators for Off-Line Power Supplies".
Clark Nelson, "The LT 1248 Power Factor Corrector", Linear Technology Magazine, Jun. 1993.
Fred C. Lee, Wojciech A. Tabisz and Milan M. Jovanovic, "Recent Developments in High-Frequency Quasi-Resonant and Multi-Resonant Converter Technologies", Aachen 1989.
Liu and Lee, "Zero-Voltage-Switching Technique in DC/DC Converters", 1986.
Tabisz, Gradzki, and Lee, "Zero-Voltage-Switched Quasi-Resonant Buck and Flyback Converters", 1989.
Jovanovic, Tabisz, and Lee, "Zero-Voltage-Switching Technique in High Frequency Off-Line Converters".
Tabisz and Lee, "Zero-Voltage-Switching Multi-Resonant Technique—A Novel Approach to Improve Performance of High-Frequency Quasi-Resonant Converters".
Sabate, Vlatkov, IC, Ridley, Lee and Cho, "Design Considerations for High-Voltage-Switched PWM Converter".
Fang, Chen and Lee, "Designing a High Efficiency FET Inverter Module for Vector Summation Switching High Power Amplier".
Hua, Lee and Jovanovic, "An Improved Zero-Voltage-Switched PWM Converter Using a Saturable Inductor", 1991.
Vorperian, "Quasi-Square-Wave Converters: Topologies and Analysis".
Hua and Lee, A New Class of Zero-Voltage-Switched PWM Converters, 1991.
Robert Streit and Daniel Tollik, "High Efficiency Telecom Rectifier Using A Novel Soft-Switched. Boost-Based Input Current Shaper", ITT 1991.
Hacy Bodur and A. Faruk Bakan, "A New ZVT-PVVM DC-DC Converter", IEEE 2002.
Hacy Bodur and A. Faruk Bakan, "A New ZVT-ZCT-PWM DC-DC-Converter", IEEE 2004.
K. Mark Smith Jr. and K.M. Smedley, Properties and Synthesis of Passive, Lossless Soft-Switching PWM Converters, International Congress of Israel in Energy Power & Motion Control, May 1997.
Laszlo Balogh, Chris Bridge, and Bill Andreycak, "Unique Cascaded power Converter Topology for High Current Low Output Voltage Application".
Chinese Office Action, Publication No. 2005100840791.
1995 paper with translated abstract, "Study on Multi-Function Arc Welding Dual Inverter".
Japanese Office Action, Patent Application No. 2006-030436, Apr. 9, 2008.
Japanese Office Action, Patent Application No. 2005-314067, Apr. 9, 2008.
Mantaro Nakamura, "A Chopper Type DC/DC Converter", Application No. 7-283959, filed Oct. 31, 1995.
Japanese Office Action, Patent Application No. 2006-015765, Apr. 9, 2008.
Koichi Makinose et al., "DC/DC Converter", Application No. 2-223521, filed Aug. 24, 1990.
European Search Report, EP 06 00 0263, Munich, May 30, 2006, Jeggy T.
European Search Report, EP 06 00 0268.
Japanese Office Action, Patent Application No. 2005-134928, Jun. 19, 2008.
The Notification of the First Office Action, Jun. 13, 2008.
U.S. Appl. No. 10/889,866, Power Source for Electric Arc Welding, LEEE 2 00425.
Office Action of the IPO, Sep. 23, 2008.
Canadian Office Action, Nov. 6, 2008.
Office Action of the IPO, Sep. 18, 2008.
The Notification of the First Office Action, Aug. 8, 2008.
Notice of the Final Rejection, Oct. 7, 2008, Patent Application No. 2005-314067.
Notice of Final Rejection, Oct. 7, 2008, Patent Application No. 2006-015765.

(56) References Cited

OTHER PUBLICATIONS

EP communication, Dec. 16, 2008.
U.S. Appl. No. 10/889,866 Non-Final Rejection dated Oct. 27, 2010.
U.S. Appl. No. 11/087,179: Non-Final Rejection dated Jan. 25, 2011.
U.S. Appl. No. 11/551,957: Non-Final Rejection dated Nov. 15, 2011.
U.S. Appl. No. 11/051,196: Final Rejection dated Nov. 26, 2010.
JP Application No. 2006-30436; Official Action dated Oct. 5, 2010 with English translation.
JP Application No. 2005-134928: Official Action dated Oct. 5, 2010 with English translation.
Non-Final Office Action for U.S. Appl. No. 11/087,179; Date of Mailing: Mar. 6, 2012; 20 pages.
Non-Final Office Action for U.S. Appl. No. 11/551,957; Date of Mailing May 30, 2012; 19 pages.
Non-Final Office Action for U.S. Appl. No. 11/051,196; Date of Mailing: Mar. 7, 2013; 48 pages.
Notice of Allowance for U.S. Appl. No. 11/087,179; Date of Mailing: Mar. 14, 2013; 19 pages.
Haruo Moriguchi, "An Arc Welding Machine", Application No. 56-212074, fled Dec. 25, 1981.
Masahiko Akamatsu, "DC Power Control Apparatus", Application No. 41-80885, filed Dec. 10, 1996.
AU Application No. 2005202559: Office Action dated Nov. 1, 2006.
CN Application No. 2005100840791: Notification of the Second Office Action dated Aug. 8, 2008 & English translation (Note: Reference 1 is the Ding article).
EP Application No. 05 005216.6: EPO Communication dated Nov. 13, 2009.
EP Application No. 05 005216.6: EPO Communication dated Feb. 13, 2007.
JP Application No. 2005-134928: Notification of Reasons for Refusal dated Jan. 6, 2009.
JP Application No. 2005-134928: Interrogation on Appeal dated Apr. 27, 2010 with a Appeal, Claims on Appeal and English translation of same.
"High Power Factor Preregulator"—Application Information for UC1854, UC2854, UC3854, Unitrode Integrated Circuit, pp. 5-218-5-225.
Covi, "A Combined Buck and Boost Converter for Single—Phase Power Factor Correction", 2005 IBM Power and Cooling Technology Symposium, Oct. 7, 2005.
Jiang and Lee, "A New Control Scheme for Buck+Boost Power Factor Correction Circuit", Proceedings of the Virginia Power Electronics Seminar, Sep. 19-21, 1993; pp. 189-193.
Ridley, Kern and Fuld, "Analysis and Design of a Wide Input Range Power Factor Correction Circuit for Three-Phase Applications", IEEE, 1993, pp. 299-305.
U.S. Appl. No. 10/889,866: Amendment Submission with RCE (Jul. 12, 2010) and Final Rejection (Nov 11, 2009).
U.S. Appl. No. 11/551,957: Amendment Response After Non-Final (Aug. 23, 2010) and Non-Final Rejection (Mar 23, 2010).
U.S. Appl. No. 11/087,179: Amendment Response After Non-Final (Jul. 30, 2010) and Non-Final Rejection (Apr 2, 2010).
U.S. Appl. No. 11/051,196: Amendment Response After Non-Final (Jun. 8, 2010) and Non-Final Rejection (Dec. 8, 2009).
CA Application No. 2,526,523: Office Action (Aug. 5, 2009).
JP Application No. 2006-30436: Interrogation (Jan. 5, 2010) and Notice of Final Rejection (Dec. 2, 2008).

\* cited by examiner

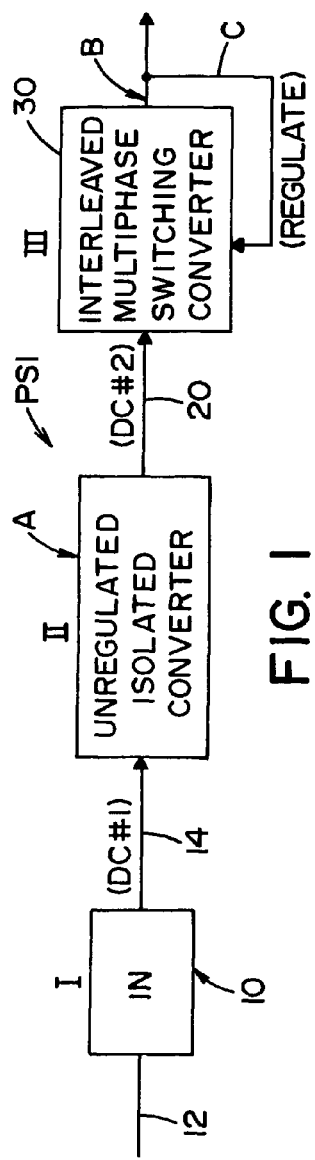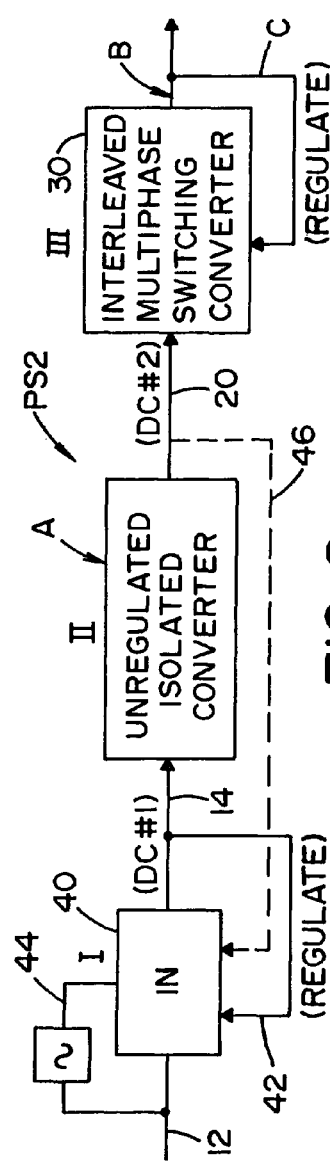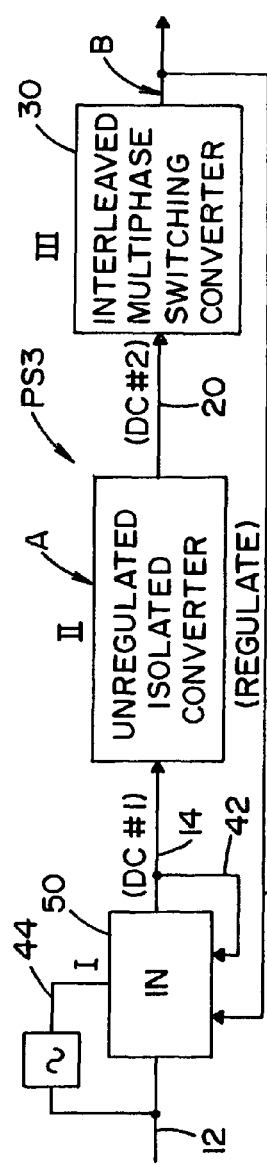

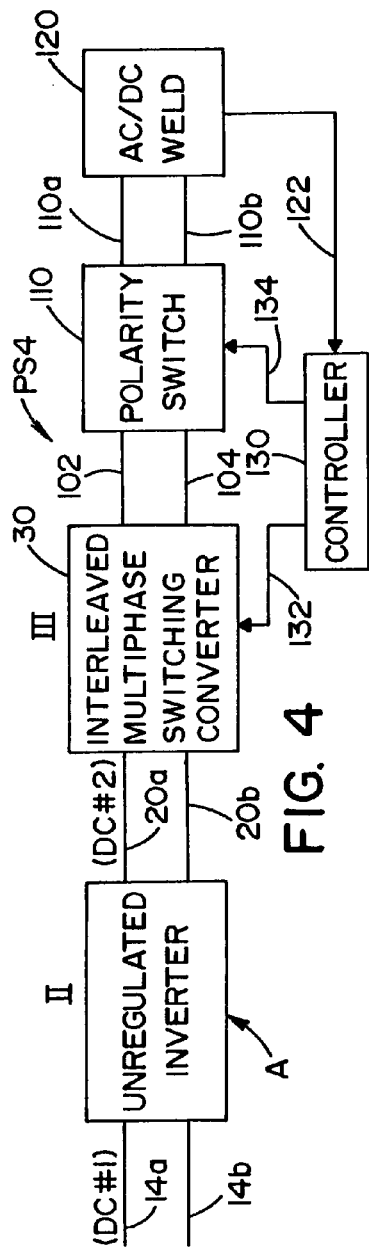
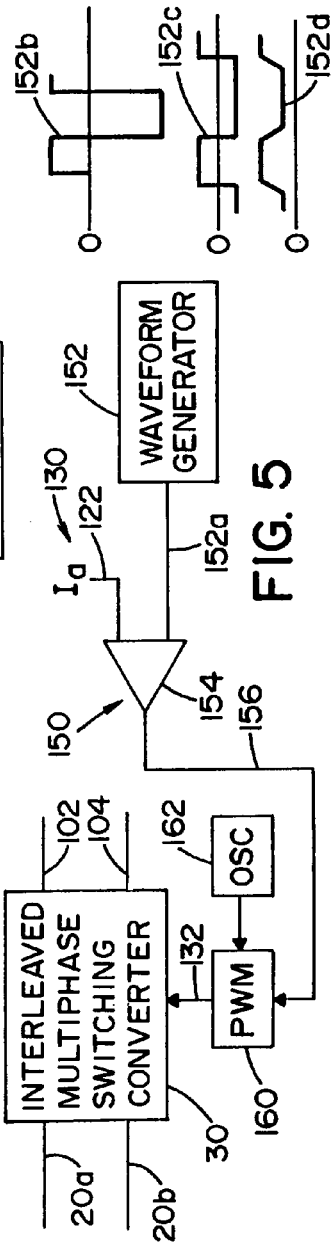
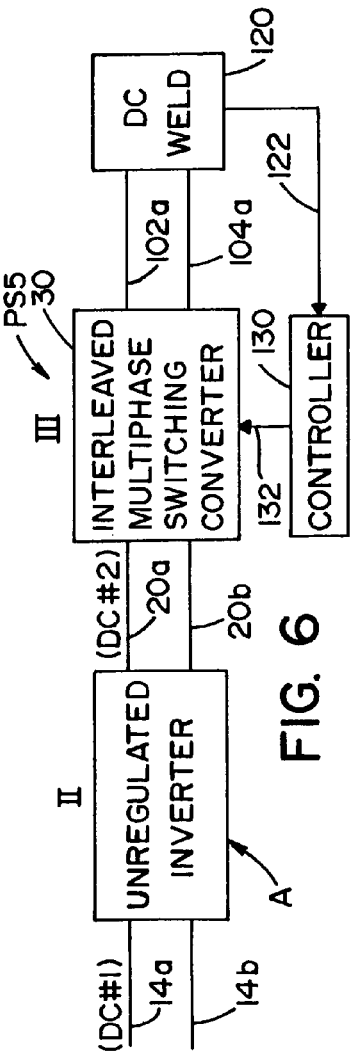
FIG. 4
FIG. 5
FIG. 6

CHOPPER OUTPUT STAGE FOR ARC WELDER POWER SOURCE

FIELD OF THE INVENTION

The present invention relates generally to power sources for welding and plasma cutting equipment, and more particularly to an interleaved multiphase chopper output stage in a three stage power source for welding or cutting systems.

INCORPORATION BY REFERENCE

The following patents and patent applications and other documents are hereby incorporated by reference as background information: Calkin U.S. Pat. No. 3,737,755; Fletcher U.S. Pat. No. 3,984,799; Karadsheh U.S. Pat. No. 4,433,370; Ogawa U.S. Pat. No. 4,748,397; Parsley U.S. Pat. No. 5,008,795; Smolenski U.S. Pat. No. 5,019,952; Blankenship U.S. Pat. No. 5,278,390; Thommes U.S. Pat. No. 5,601,741; Baker U.S. Pat. No. 5,864,116; Moriguchi U.S. Pat. No. 5,926,381; Kooken U.S. Pat. No. 5,991,169; Vogel U.S. Pat. No. 5,991,180; Reynolds U.S. Pat. No. 6,051,804; Moriguchi U.S. Pat. No. 6,069,811; Church U.S. Pat. No. 6,177,645; Moriguchi U.S. Pat. No. 6,278,080; Reynolds U.S. Pat. No. 6,300,589; Church U.S. Pat. No. 6,504,132; Boylan U.S. Pat. No. 6,618,274; Hoverson U.S. Pat. No. 6,723,957; Daniel U.S. patent application Ser. No. 10/889,866, entitled POWER SOURCE FOR ELECTRIC ARC WELDING, filed Jul. 13, 2004; Cho "Novel Zero-Voltage-Transition PWM Multiphase Converters", IEEE transactions on power electronics, Vol. 13, No. 1, January 1998; Schuellein "Multiphase Converter Bucks Power", EE Times, Sep. 11, 2000; Huang, "A Scalable Multiphase Buck Converter with Average Current Share Bus", International Rectifier publication as presented at APEC 03; Czogalla "Automotive Application of Multi-Phase Coupled-Inductor DC-DC Converter", IAS 2003; Wong "Performance Improvements of Interleaving VRMs with Coupling Inductors", IEEE transactions on power electronics, Vol. 16, No. 4, July 2001, Zumel "Magnetic Integration for Interleaved Converters", IEEE 2003; Dixon "Coupled Filter Inductors in Multi-Output Buck Regulators", Unitrode, Texas Instruments, 2003; Shortt "A 600 Watt Four Stage Phase-Shifted-Parallel DC-TO-DC Converter", Naval Research Laboratory Space Systems Technology Division, 1985; and Ridley, "The incredible Shrinking (Unregulated) Power Supply".

BACKGROUND OF THE INVENTION

Welding power sources often include a first stage that converts an AC input signal to a DC signal, and a final regulated output stage that converts the DC signal into a signal for welding. The term "welding" includes "plasma cutting", wherein it is desirable to isolate the welding or cutting process from the input power. Vogel U.S. Pat. No. 5,991,180 discusses a chopper having an output isolation transformer located after welding regulation and directly driving the welding operation, wherein the chopper network creates a desired regulated output welding current and isolation is provided in the output stage. Thommes U.S. Pat. No. 5,601,741 discloses a boost converter driving a pulse width modulated (PWM) inverter that creates a regulated welding output signal, where the second stages of both Vogel and Thommes are regulated to supply the power factor controlled current from a preregulator directly into a welding operation. Welding power sources are shown in Moriguchi U.S. Pat. No. 5,926,381, Moriguchi U.S. Pat. No. 6,278,080, and Moriguchi U.S. Pat. No. 6,069,811 in which a regulated output inverter is driven by an input boost converter or a DC output of a rectifier to produce a current suitable for welding to an output transformer used for isolation, where the output of the transformer secondary is used for the welding operation. There is no three stage topology in the above patents as is used in the novel power source for practicing the present invention. Daniel, U.S. patent application Ser. No. 10/889,866, is assigned to the assignee of the present invention and describes a three stage power source architecture for welding, in which a first stage converts AC power to a first DC output signal, a second stage converts the first DC output signal into a second DC output signal, and a third stage converts the second DC output signal into a process output for welding, where the second stage is unregulated. The Daniel patent application is incorporated herein by reference as background information and is not prior art. The three stage welder of Daniel has a regulated first stage, as is common, and a welding regulated output stage where a welding signal is determined by feedback from the actual welding process. This is also common, but a novel feature of Daniel is an isolation unregulated intermediate stage between the regulated first stage and the output stage, where the output stage is regulated by feedback to create a signal suitable for welding.

With respect to background technology, Boylan U.S. Pat. No. 6,618,274 illustrates a synchronous rectifier, and Calkin U.S. Pat. No. 3,737,755 discloses a DC/DC converter for low power use where a fixed regulated current is directed to a non-regulated inverter to provide a non variable output DC signal. The general background technology in Boylan U.S. Pat. No. 6,618,274 and Calkin U.S. Pat. No. 3,737,755 is incorporated by reference herein to show a synchronous rectifier where any output regulation is performed before the inverter by controlling the level of the input DC signal, where neither of these patents relate to a power source for welding and are only incorporated by reference as general technical concepts, such as synchronous rectifier devices and unregulated inverters. Smolenski U.S. Pat. No. 5,019,952 shows a non-welding two stage AC to DC converter for imparting minimum harmonic distortion to the current flowing into the converter. Unlike welding situations, the load in Smolenski U.S. Pat. No. 5,019,952 is not variable and does not require regulation, wherein this patent is incorporated by reference to show general technology as background information with respect to the present invention.

Switching converters are often employed as the final output stage for creating the output welding current according to a desired welding waveform, where the weld process may require DC or AC current waveforms to create a welding arc between an advancing electrode and the workpiece being welded. Such converters are typically PWM designs, in which switches are operated at high frequency to create the desired waveform or current level for the welding process, for example, as discussed in Blankenship U.S. Pat. No. 5,278,390. In modern arc welders, the final converter stage often employs "waveform control technology" pioneered by The Lincoln Electric Company of Cleveland, Ohio where the welder output is generated using a series of short pulses at a frequency generally above audible levels and the group of short pulses has a waveform or profile controlled by a waveform generator. As shown in Kooken U.S. Pat. No. 5,991,169 and Church U.S. Pat. No. 6,504,132, the welding output current can be regulated by an output chopper or buck converter, with isolation being achieved using a transformer either in the output of an inverter stage or in the output of an input boost converter.

Switching converters, such as buck, boost, or other type DC to DC converters, have been developed in non-welding contexts, which include two or more converter phases or cells for inputting DC power and providing a DC output. Such converters are sometimes referred to as multiphase converters, for example, as shown in Fletcher U.S. Pat. No. 3,984,799 and Ogawa U.S. Pat. No. 4,748,397. Huang, "A Scalable Multiphase Buck Converter with Average Current Share Bus" and Schuellein, "Multiphase Converter Bucks Power" describe scalable multiphase converters targeting advanced microprocessor applications. Cho "Novel Zero-Voltage-Transition PWM Multiphase Converters" illustrates two and three-phase DC to DC converters with a single auxiliary zero-voltage switching (ZVS) circuit to reduce switching losses. Multiphase converters have also been employed in automotive applications, as discussed in Karadsheh U.S. Pat. No. 4,433,370 and Czogalla "Automotive Application of Multi-Phase Coupled-Inductor DC-DC Converter", where Czogalla discusses coupling inductors of individual phases together on a common core. Coupled inductors in multiphase interleaved regulator modules and converters are also described in Wong "Performance Improvements of Interleaving VRMs with Coupling Inductors"; Zumel "Magnetic Integration for Interleaved Converters"; and Dixon "Coupled Filter Inductors in Multi-Output Buck Regulators". These references are incorporated by reference herein as background information, and do not teach use of multiphase converters in a three stage power source. Baker U.S. Pat. No. 5,864,116, shows a two-phase down chopper with coupled inductors for welding, and is assigned to the assignee of the present invention. Reynolds U.S. Pat. No. 6,051,804 and Reynolds U.S. Pat. No. 6,300,589 illustrate a plasma cutting power supply having dual choppers providing power from a voltage source to a load, in which the open circuit output voltage is approximately twice the load output voltage. However, neither Baker nor the Reynolds patents teach multiphase output stages in a three stage welding power source.

In welding systems, the power efficiency of a welding power source is an important design parameter, where low efficiency power sources produce excess heat, and are generally larger and more bulky than more efficient sources. In general, it is desirable to reduce or minimize the electrical switching and conduction losses in the components of a welder power source to increase the efficiency. Furthermore, it is desirable to minimize ripple currents in a power source to minimize electrical stress to capacitors and other components, as well as to improve the quality of the weld operation. Another design goal is fast transient or impulse response (e.g., high slew rate), wherein it is desirable to provide a welder power source able to transition quickly between different output signal levels for waveform control and to quickly adapt to changing load conditions, particularly for short-circuit welding and other applications in which welding arc conditions may change rapidly. In this regard, welding power sources typically have very different operational requirements than most power supply designs in which load fluctuations are minimal. In addition, welding power sources often include large filter capacitors and/or series inductors or chokes to maintain output signal levels and internal DC voltages within certain ranges or limits during fast load transients, wherein the need for such filtering or smoothing components is greater if the switching converter controls are bandwidth limited.

In the advancement of welding power sources, it is therefore desirable to increase the operating bandwidth of the final output stage to mitigate or avoid the need for large filtering components and to thereby improve transient response of the source. Although less filtering facilitates improved slew rates, reduced output filtering may lead to higher ripple currents and voltages. Furthermore, switching losses generally increase as the switching converter operating frequency is increased. Simply increasing the switching speed of an output chopper stage would require larger switching devices to withstand the additional heat generated and/or additional or larger heat removal devices, such as fans, heat sinks, etc., whereby the component count, size, and cost of the welding system increases and the system power efficiency is worsened. One possible approach is to increase the converter bandwidth or switching frequency while employing so-called soft-switching techniques to power transistors and other components in the output chopper stage to reduce the amount of switching losses, and also to potentially reduce the amount of electromagnetic or radio frequency interference (EMI, RFI). However, using soft switching requires additional auxiliary components, reduces chopper efficiency, and the auxiliary inductors and rectifiers are subjected to high currents. Thus, there is a need for improved welder power sources with higher bandwidth switching converter output stages, by which good transient response can be achieved without significantly impacting system cost and efficiency.

SUMMARY OF INVENTION

A summary of one or more aspects of the invention is now presented in order to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The present invention relates to improved welder power sources in which an interleaved multiphase switching converter is employed as a regulated final stage in a power source of the novel concept with an intermediate unregulated DC to DC converter. The interleaved multiphase converter provides regulated signals suitable for welding, i.e., also plasma cutting, and can be operated at switching frequencies impractical in equivalent single phase converters, whereby the advantages of higher output stage bandwidth can be achieved without significantly degrading system efficiency and without unduly adding to the system cost. In this regard, the use of multiple phases or power circuits in the high speed output chopper results in reduced ripple current levels, whereby the size and values of output chokes or inductors can be reduced. This inductor size reduction facilitates the use of board mounted chokes instead of larger chokes found in single phase converters, and the reduced inductance values improves the dynamic transient response of the output stage. Moreover, the individual parallel power circuits can be designed for a given maximum current rating with the number of power circuits in a given power source design being determined by the desired converter current output, whereby different welding or plasma cutting systems can be designed using different numbers of modular chopper power circuits. Furthermore, since the currents provided by the individual power circuits are relatively low, high efficiency and low component current stresses can be achieved, while providing potentially unlimited bandwidth for advanced welding techniques.

In accordance with one or more aspects of the invention, the novel three stage arc welding or cutting power source is provided with a third stage including an interleaved multiphase switching converter. In this manner, the first stage receives an AC input signal and provides a first DC output signal and the second stage is an unregulated converter coupled to receive the first DC output signal and convert the first DC output signal into a second DC output signal. The third stage of the power source receives the second DC output signal, and includes a plurality of converter power circuits that convert the second DC output signal to provide a signal suitable for a welding or cutting process. The third stage converter power circuits are connected in parallel between the welding and the novel unregulated second stage, and are operated out of phase with respect to one another so as to minimize ripple current levels, whereby the overall ripple current rating of the third stage converter is less than that of the individual converter power circuits. The individual converter power circuits can be buck or other type converters, where the inductors of the converter power circuits may be integrated onto a single core in coupled or uncoupled fashion for system size and cost reduction, and two or more of the power circuits can be operated with temporal overlap. In addition, the converter power circuits can be designed for a given voltage range, where the parallel connection of N power circuits provides the third stage with a converter maximum current rating that is about N times the maximum current rating of the individual converter power circuits. This allows construction of welding power sources operable at virtually any current amperage where the individual converter power circuit modules are designed for operation at typical welding voltage levels, wherein the welder output voltage is essentially unrelated to the number of output stage converter power circuits.

BRIEF DESCRIPTION OF THE DRAWINGS

The following description and drawings set forth in detail certain illustrative implementations of the invention, which are indicative of several exemplary ways in which the principles of the invention may be carried out. Other objects, advantages and novel features of the invention will become apparent from the following detailed description of the invention when considered in conjunction with the drawings, in which:

FIG. 1 is a schematic diagram illustrating a three stage power source with an interleaved multiphase output stage switching converter providing a regulated process output signal using power from an unregulated isolated second stage in accordance with one or more aspects of the present invention;

FIGS. 2 and 3 are schematic diagrams similar to FIG. 1 illustrating further embodiments of a three stage power source in accordance with the invention;

FIG. 4 is a schematic diagram illustrating second and third stages of a power source constructed in accordance with the present invention wherein the multiphase output stage provides AC welding current;

FIG. 5 is a schematic diagram of a waveform technology control circuit for controlling the regulated signal provided by the multiphase third stage in the embodiment of FIG. 4, along with graphs showing three exemplary welding regulated signal waveforms;

FIG. 6 is a schematic diagram illustrating a second and third stage of a power source constructed in accordance with the present invention wherein the output stage provides DC welding current;

DETAILED DESCRIPTION OF THE INVENTION

Figure 7:
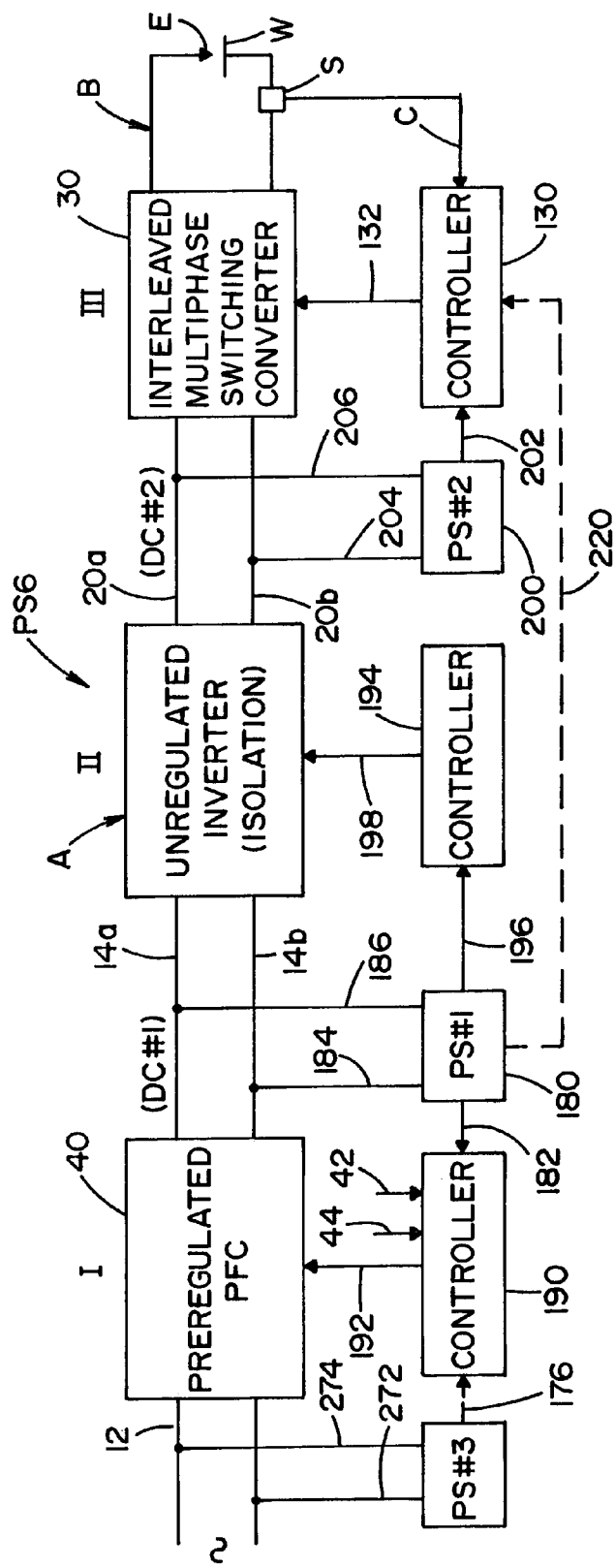
FIG. 7 is a schematic diagram illustrating the topography of a three stage power source according to the invention for creating an output current suitable for electric arc welding with two separate controller voltage supplies.

One or more embodiments or implementations of the present invention are hereinafter described in conjunction with the drawings, wherein like reference numerals are used to refer to like elements throughout and wherein the illustrated structures are not necessarily drawn to scale. Certain aspects of the invention relate to three stage power sources for use in creating output signals suitable for welding or plasma cutting operations, collectively referred to hereinafter as welding power sources, wherein the concept of electric arc welding also encompasses the related technology of plasma arc cutting. An input stage is provided for converting an AC signal into a first DC output signal, which preferably has a fixed voltage level, and an unregulated second stage is also provided, which may include isolation components, and which provides a second DC output signal. Importantly, the third power source stage is constructed as an interleaved multiphase converter which converts the second DC signal to a regulated signal useable in welding or cutting operations, to facilitate the above mentioned advantages of higher bandwidth operation, low ripple currents, smaller component sizes, and improved transient response. The invention may thus be advantageously employed in welding systems to implement advanced waveform control techniques without suffering from poor efficiency or increased cost or size.

Along with the high bandwidth capabilities afforded by the multiphase structure of the output stage, the unregulated second stage inverter may also be operated at a fast switching rate, wherein the switches thereof are operated at a high switching frequency greater than 18 kHz and preferably about 100 kHz in one example. The fast switching speeds in the unregulated second stage inverter allow use of small magnetic components therein, and the DC output provided from the second stage to the third stage is preferably isolated. The interleaved multiphase third stage chopper is preferably regulated by a welding parameter, such as current, voltage, or power of the welding operation with temporal overlap in the operation of two or more of the parallel converter power circuits thereof. Consequently, the topography of one implementation of the present invention has an input stage to produce a first DC signal, a second unregulated DC to DC stage to provide an isolated fixed DC voltage that is used by the third stage of the power source for regulating the current used in the welding operation, where the final output stage is an interleaved multiphase converter. Other aspects of the invention relate to the use of multiphase interleaved power stages generally for creating a regulated signal suitable for a welding or plasma cutting operation. FIGS. 1-3 illustrate three exemplary implementations of certain aspects of the present invention in the context of three-stage power sources, wherein any suitable first stage may be employed for converting AC input power to a first DC output signal within the scope of the invention. In addition, any type of unregulated second stage may be used to convert the first DC output signal to a second DC output signal, where the second stage may also be isolated. Moreover, any type of multiphase third stage converter may be employed within the scope of the invention, which receives the second DC output signal and provides a regulated signal suitable for a welding, cutting, or other arc processing operation.

A first three stage power source PS1 is shown in FIG. 1, including a first stage I, an unregulated isolated second stage II, and an interleaved multiphase third stage converter III. The first stage I in this embodiment includes an AC to DC converter 10 for converting AC input signal 12 into a first DC output signal 14. The input 12 is a single phase or a three phase AC line supply with voltage that typically can vary between 115-575 volts, although the invention is not limited to any particular number of input phases or to any specific input voltage values. Converter 10 is illustrated as an unregulated device which can be in the form of a rectifier and filter network to produce first DC output signal 14 (DC#1). Since the AC input signal is a line voltage, DC#1 is generally uniform in magnitude. In the second stage II, an unregulated inverter A is provided in the form of a DC to DC converter with an isolation transformer to convert the first DC output signal 14 (DC#1) into a second DC output signal 20 (DC#2).

The second DC output signal 20 forms the power input to stage III, which includes a multiphase interleaved DC to DC converter 30 for converting the second DC output signal voltage on line 20 into a regulated signal (e.g., a current or voltage) suitable for welding at line B. A feedback control or regulation loop C senses a parameter in the welding operation for regulating the current, voltage, and/or power on output signal line B by regulation of third stage multiphase converter 30. In practice, converter 30 is a chopper or switching converter, such as a multiphase interleaved buck converter (e.g., FIGS. 10A-12B below), although use of a multiphase boost converter, buck-boost converter, cuk converter, etc., or a multiphase inverter are possible alternatives, wherein all such variant implementations of a multiphase converter are contemplated as being within the scope of the invention and the appended claims. Further, the switching network of the second stage A can be operated at a frequency that is higher than the switching frequency of the third stage converter 30 in the three stage power source PS1 as shown in FIG. 1, although not a strict requirement of the invention. In addition, the second DC output signal voltage in line 20 (DC#2) can be substantially less than the first DC output signal voltage from stage I on line 14 (DC#1), although not a requirement of the invention. In a preferred implementation, moreover, an isolation transformer can be provided in second stage inverter A, having an input or primary section or side with substantially more turns than a secondary section or side used to create the second DC output signal voltage DC#2 on line 20. In one particular example, a transformed turns ratio of 4:1 is used so that the second DC output signal voltage on line 20 is about ¼ the first DC output signal voltage DC#1 on line 14, although any suitable turns ratio can be used, where the first DC output signal voltage DC#1 need not be larger than the second DC output signal voltage DC#2, and wherein the second stage II can be unregulated.

FIG. 2 illustrates another implementation of the invention wherein a three stage power source PS2 has essentially the same stage II and stage III as power source PS1 described above. In the embodiment of FIG. 2, however, input stage I is an AC to DC converter 40 including a rectifier followed by a regulated DC to DC converter to provide the first DC output signal DC#1. The converted signal is a DC output signal in line 14 shown as a first DC signal (DC#1). The first DC output signal voltage on line 14 is regulated as indicated by feedback line 42 in accordance with standard technology. Thus, in one implementation of power source PS2, first DC output signal DC#1 and second DC output signal DC#2 are controlled according to the regulation 42, and output welding converter 30 is regulated by an output feedback loop C. With respect to first stage I, first DC output signal voltage DC#1 on line 14 is regulated by feedback loop 42, wherein the exemplary converter 40 also provides power factor correction by sensing the AC input voltage waveform 12 as represented by line 44. By using power source PS2 in FIG. 2, the first DC output signal 14 is a fixed DC output signal voltage DC#1 for different single or three phase voltages at input 12. Thus, second DC output signal voltage DC#2 at 20 is merely a conversion of first DC output signal voltage DC#1 on line 14. Second DC output signal DC#2 in this implementation is thus a fixed voltage with a level determined by the isolation transformer and the fixed duty cycle of the switching network in unregulated second stage inverter A. This is a preferred implementation of the novel power source employing three separate and distinct stages with stage II being an unregulated inverter for converting a fixed first DC output signal to a second fixed DC output signal used to drive a regulated interleaved multiphase switching converter 30, such as a chopper or inverter. As another possible alternative, stage I could be regulated by a feedback from DC #2 in line 20, as represented by a dashed feedback loop or line 46 in FIG. 2.

Another possible implementation of a three stage power source PS3 is shown in FIG. 3 according to the invention, in which a first stage input converter 50 is regulated by a feedback loop 52 from the welding current process output signal B, and may further control the first DC output signal DC#1 according to the first stage feedback 42 and according to power factor correction via line 44. In the illustrated example of FIG. 3, converter 50 is preferably regulated by the welding output feedback 52 and not by the first DC output signal voltage DC#1 on line 14 as was the case in power source PS2 of FIG. 2, although this feedback control architecture is not a requirement of the present invention. With regulation from welding output B in FIG. 3, converter 50 is both a power factor correcting stage and a welding regulator. It is noted, however, that this implementation of the invention is disclosed for a complete technical disclosure of the three stage power source as contemplated by the present invention, and that power factor correction is not a strict limitation of the invention.

As previously described, input stage I converts either a single phase or a three phase AC signal 12 into a fixed DC 14 (DC#1) for use by the unregulated inverter A constituting second stage II. The implementation of the present invention generally employs a DC to DC converter 10, 40, 50 in stage I to produce the first DC output signal voltage DC#1 at line 14 in FIGS. 1-3. The DC to DC converter 10,40,50 of stage I can be selected to create the desired signal voltage DC#1 on line 14, wherein an input rectifier provides a DC voltage to a first stage DC to DC converter (not shown) which may be a boost converter, a buck converter, a buck+boost converter, or other suitable DC to DC converter architecture. Such a DC to DC converter of the first stage I may advantageously perform power factor correction (e.g., FIGS. 2 and 3) by sensing the input AC waveform via line 44 and controlling the first DC output signal DC#1 in accordance therewith, in order to reduce harmonic distortion at the input 12 of the three stage power source PS2, PS3 and/or to ensure that the input AC current and voltage are in phase to the extent possible. The use of a power factor correcting input DC to DC converter 40, 50 is well known in the welding art and is used in many prior art two stage topographies, although power factor correction is not a strict requirement for practicing the present invention. In this regard, the primary purpose of stage I is to provide a first DC (DC#1) at line 14 (indicated as lines 14a, 14b in subsequent figures), which is then used by the second stage II to produce a fixed DC (DC#2) in line 20 (indicated by lines 20a, 20b in subsequent figures). It is noted that alternative implementations are possible using a non power factor correcting input or first stage 10 as shown for example in FIG. 1, wherein output lines of an input rectifier are coupled by a large storage capacitor (not shown) to produce a filtered, generally fixed, first DC output signal voltage DC#1 at line 14. In another alternative implementation, the first stage I could include a passive power factor correcting circuit 40, 50 connected to a single or multiphase AC input 12 to produce a generally fixed DC voltage at 14 (DC#1) as an input of the second stage inverter A. The above mentioned stage 1 architectures are merely examples and other input stages could be used in practicing the invention with either single phase or three phase input signals, with or without power factor correcting, and with or without regulation.

Referring also to FIG. 4, in certain preferred implementations, a relatively low fixed second DC output signal DC#2 is provided on output 20 (e.g., illustrated as lines 20a, 20b in FIGS. 4-10 and 12), wherein the multiphase third stage III of the novel three stage welding power source can be a chopper or other converter operated at a frequency greater than 18 kHz to provide the advantages of increased bandwidth. The switching frequencies of the unregulated second stage inverter A and the regulated output multiphase converter 30 may, but need not, be different. In this regard, the switching frequency of the multiphase interleaved chopper output stage 30 can be substantially less than the frequency of unregulated inverter A in one example, although the specific frequency relationship of the second and third stages is not a strict requirement of the invention.

Power source PS4 shown in FIG. 4 illustrates the use of the present invention wherein stage III includes an interleaved multiphase DC to DC switching converter 30, and further comprises a polarity switch 110 to facilitate AC welding 120 at output terminals or lines 110a and 110b, wherein the power source PS4 includes a third stage controller 130 providing control signals 132 and 134 to converter 30 and to polarity switch 110, respectively. The multiphase converter 30 is driven by a generally fixed input DC 20 (first DC output signal DC#1) and may be regulated by feedback from an AC or DC welding operation 120 to provide current suitable for welding across output leads 102, 104. Moreover, the regulated signal may be provided through polarity switch 110 via leads 110a and 110b, as shown in FIG. 4, in order to provide for AC welding, wherein lead 102 is a positive polarity lead and lead 104 is a negative polarity lead. In this regard, polarity switch 110 has a first position in which lead 102 is directed to the electrode of the welding operation 120 so the output of polarity switch 110 has a positive polarity on output line 110a and a negative polarity on output line 110b. This produces an electrode positive (EP) DC welding process at weld operation 120. Reversal of polarity switch network 110 can produce an electrode negative (EN) DC welding process at weld operation 120.

Thus, a DC welding process with either electrode negative or electrode positive can be performed according to the setting of the standard polarity switch 110. In a like manner, polarity switch 110 can be alternated between electrode negative and electrode positive to produce an AC welding process at weld operation 120. The polarity switch 110 thus drives the DC output from regulated multiphase converter 30 to produce either an AC welding process or a DC welding process 120, which may advantageously be regulated and controlled via a feedback system indicated in FIG. 4 as line or loop 122 directed to controller 130 for regulating multiphase converter 30 and for setting the polarity of switch 110 as indicated by control signal lines 132, 134, respectively. By thus regulating the welding operation 120 at stage III, the unregulated inverter A at stage II can have a relatively higher switching frequency and high duty cycle to reduce the component sizes and to improve efficiency within the second stage II of the power source PS4.

Referring also to FIG. 5, certain embodiments of the present invention advantageously employ waveform control technology pioneered by The Lincoln Electric Company of Cleveland, Ohio, although not a strict requirement of the invention. This type of control system is schematically illustrated in FIG. 5, wherein control circuit 150 in the controller 130 of FIG. 4 processes a waveform profile as a voltage on line 152a provided by a waveform generator 152. The waveform profile is controlled by feedback loop 122 as schematically illustrated by error amplifier 154 having an output 156. Thus, the profile of the waveform from generator 152 is controlled by the feedback loop 122 and produces a signal in output line 156. This line 156 is directed to an appropriate PWM circuit 160 operated at a high frequency determined by the output of oscillator 162. This frequency in one example is greater than 18 kHz and is often higher than 40 kHz. Furthermore, as illustrated and described below with respect to FIGS. 10A-12B, the third stage III preferably provides out-of-phase interleaved control of multiple third stage converter power circuits via the controller 130 using multiple phase adjusted PWM output signals, and/or using phase shifting or offset circuitry (not shown) to provide individual PWM control signals to the converter power circuits of the output stage III (e.g., FIG. 11 below).

The output of the pulse width modulator 160, which may be implemented, for example, in software and/or as a digital circuit within controller 130, is shown as line 132 in FIG. 5 for controlling the waveform generated by multiphase switching third stage converter 30. The third stage converter output waveform (regulated signal provided to welding process 120) can have any profile and type, such as AC, DC, or combinations thereof, examples of which are schematically illustrated as waveforms 152b, 152c, and 152d at the right portion of FIG. 5. In one AC welding example, waveform 152*b* is provided by the converter 30 in the form of an AC waveform of the type used in AC MIG welding where the negative electrode amperage is higher than the positive electrode amperage. Alternatively, the positive amperage may be higher than the negative amperage. In waveform 152*c*, the amperage for both electrode negative and electrode positive is essentially the same with the length of the negative electrode portion being greater. Of course, a process for AC welding can be adjusted to provide balanced AC waveforms or unbalanced AC waveforms, either in favor of electrode negative or electrode positive, or the balancing may change dynamically, where the time proportion and/or the amplitude proportion may be biased toward the negative electrode or positive electrode side. When polarity switch 110 is set for either a DC negative or a DC positive welding operation (or polarity switch 110 is omitted altogether, as in FIG. 6 below), a pulse welding waveform, shown as waveform 152*d*, is controlled by waveform generator 152 for output of a regulated signal from the converter 30 to the welding process 120. Various other waveforms, both AC and DC, can be controlled by controller 130 so the welding operation 120 can be adjusted to be AC or DC. Furthermore, the welding operation can be TIG, MIG, submerged arc, or otherwise, wherein power source PS4 or other power sources using the present invention can be employed in performing any type of arc processing operation. In this regard, the process electrode (electrode E in FIGS. 7, 8, 10A, 10B, and 12 below) can be non-consumable or consumable, such as metal cored, flux cored, or solid wire, wherein a shielding gas may but need not be used according to the electrode being employed. All of these modifications in the welding operation can be performed in systems employing the various aspects of present invention.

Referring now to FIG. 6, a modification of power source PS4 is illustrated as power source PS5 to perform DC welding. In this example, power source PS5 performs only a DC welding operation 120 in which the feedback loop 122 is directed to controller 130 having an output 132. Regulated converter 30 in the power source PS5 is preferably a multiphase chopper type switching DC to DC converter to produce a DC voltage across lines 102*a*, 104*a*, wherein the controller 130 is preferably controlled by waveform generator 152 (FIG. 5). The polarity on lines 102*a*, 104*a*, moreover, can be electrode negative or electrode positive according to the demand of the DC welding process performed at welding operation 120. The regulated signal output by regulated converter 30, furthermore, can be more simplified than the welding output of power supply PS4 shown in FIG. 4. FIGS. 4 and 6, together with the control network or circuit 150 shown in FIG. 5, illustrates the versatility of the novel three stage power source and the interleaved multiphase output converter 30 constituting the present invention, wherein the illustrated embodiments are merely examples and are not exhaustive of the possible implementations of the present invention.

Figure 8:
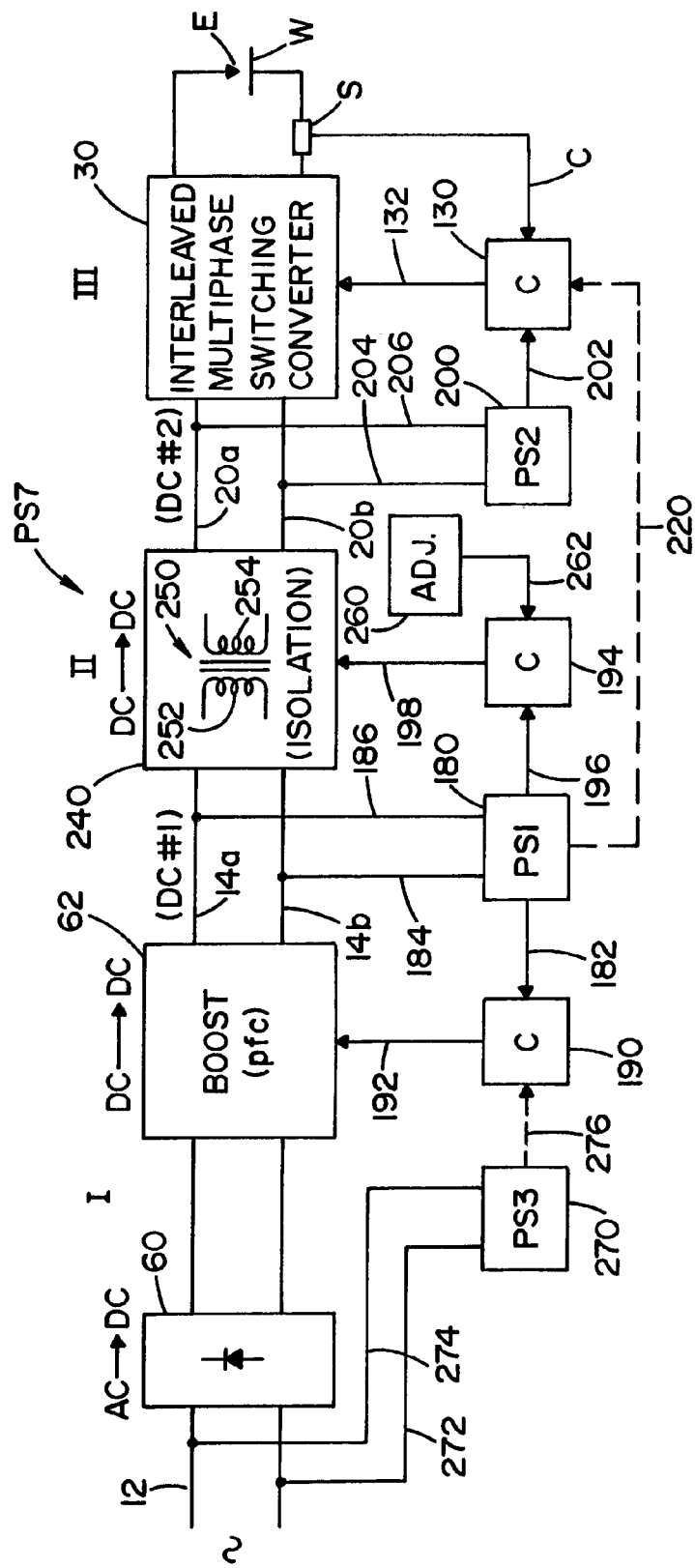
FIG. 8 is a schematic diagram illustrating an exemplary three stage power source according to the present invention.

Referring now to FIGS. 7 and 8, in implementing a two stage power source as used in the prior art or a novel three stage power source of the present invention, it is necessary to provide a voltage for operating the controllers for both the regulated and unregulated switching networks used in these two types of power sources. FIG. 7 illustrates one preferred three stage architecture in accordance with the present invention to generate regulated signals for a welding operation and to provide control voltages to operate the various controllers of a three stage power source, such as power source PS6. The use of an output of a preregulator to provide the control voltage for the switching controller of the preregulator and switching controller of the second stage of a two stage power source is well known and is disclosed in Moriguchi U.S. Pat. No. 5,926,381, incorporated by reference herein. With respect to the final stage, an output chopper for performing a welding operation routinely obtains the controller control voltage from the input DC voltage to the chopper. These two well known technologies are incorporated in power source PS6.

The three stage power source PS6 in FIG. 7 can be operated with controllers having power supplies derived from various locations in the power source. In particular, power source PS6 has a first controller power supply 180 (PS#1) with an output 182 and inputs 184, 186 from the first DC on leads 14*a*, 14*b* (DC#1). Power supply 180 includes a buck converter or flyback converter, not shown, to reduce the high voltage DC#1 at the output of preregulator 40 of FIG. 2 to a low voltage on line 182 suitable for powering a first stage controller 190. This control voltage on line 182 may be between 5 and 20 volts in one example, although other voltages are possible within the scope of the invention. Voltage on line 182 is directed to first controller 190 having an output lead 192 for performing the operation of preregulator 40 in accordance with standard technology. The preregulator 40 may employ feedback from lines 42, 44 shown in FIGS. 2 and 3, and/or may receive welder output feedback along line 52, as indicated in FIG. 3. Unregulated second stage inverter A in the exemplary implementations does not require a controller to modulate the duty cycle or the fixed relationship between the input and output voltages, but may receive a control signal on an output lead 198 from a second controller 194 that receives controller operating voltage in line 196 from the first power supply 180.

As an alternative, a third power supply PS#3 is driven by one phase of input 12 to give an optional power supply voltage 176 to first controller 190. Regulated multiphase switching converter 30 of stage III in this implementation has a second power supply 200 (PS#2) coupled to the second DC leads 20*a* and 20*b* via inputs 206 and 204, respectively, with a controller voltage on line 202 determined by the voltage on DC 20 (DC#2) illustrated as including leads 20*a*, 20*b*. Power supply 200 includes a buck converter or flyback converter to convert the DC at the output of unregulated converter A to a lower voltage for use by third stage controller 130 having an output 132. The signal on line 132 regulates the output of welding converter 30 in accordance with the feedback signal on line C, as discussed with respect to power sources PS1, PS2 in FIGS. 1 and 2, respectively, wherein the individual power circuits of multiphase converter 30 may be independently controlled by dedicated outputs 132 from controller 130, or a single PWM or other type of control output 132 may be temporally offset for individual power circuits of the converter 30, such that the individual third stage converter power circuits are operated out of phase relative to one another. DC 14 (DC#1) and DC 20 (DC#2) provide input to power supplies 180 and 200 respectively, which are DC to DC converters in one example for producing low level DC control voltage for controllers 190, 194 and/or 130. As an alternative shown by dashed line 220 in FIG. 7, first power supply 180 can also provide a control voltage for the third controller 130. FIG. 7 has been disclosed to illustrate the versatility of using a three stage power source with controllers that can receive reduced supply voltages from various fixed DC voltage levels indicated to be PS#1 and PS#2. Other arrangements could be employed for providing the controller voltage, such as a rectified connection to one phase of AC input voltage 12 via lines 272 and 274 by a transformer in a manner illustrated as PS#3.

Figure 9:
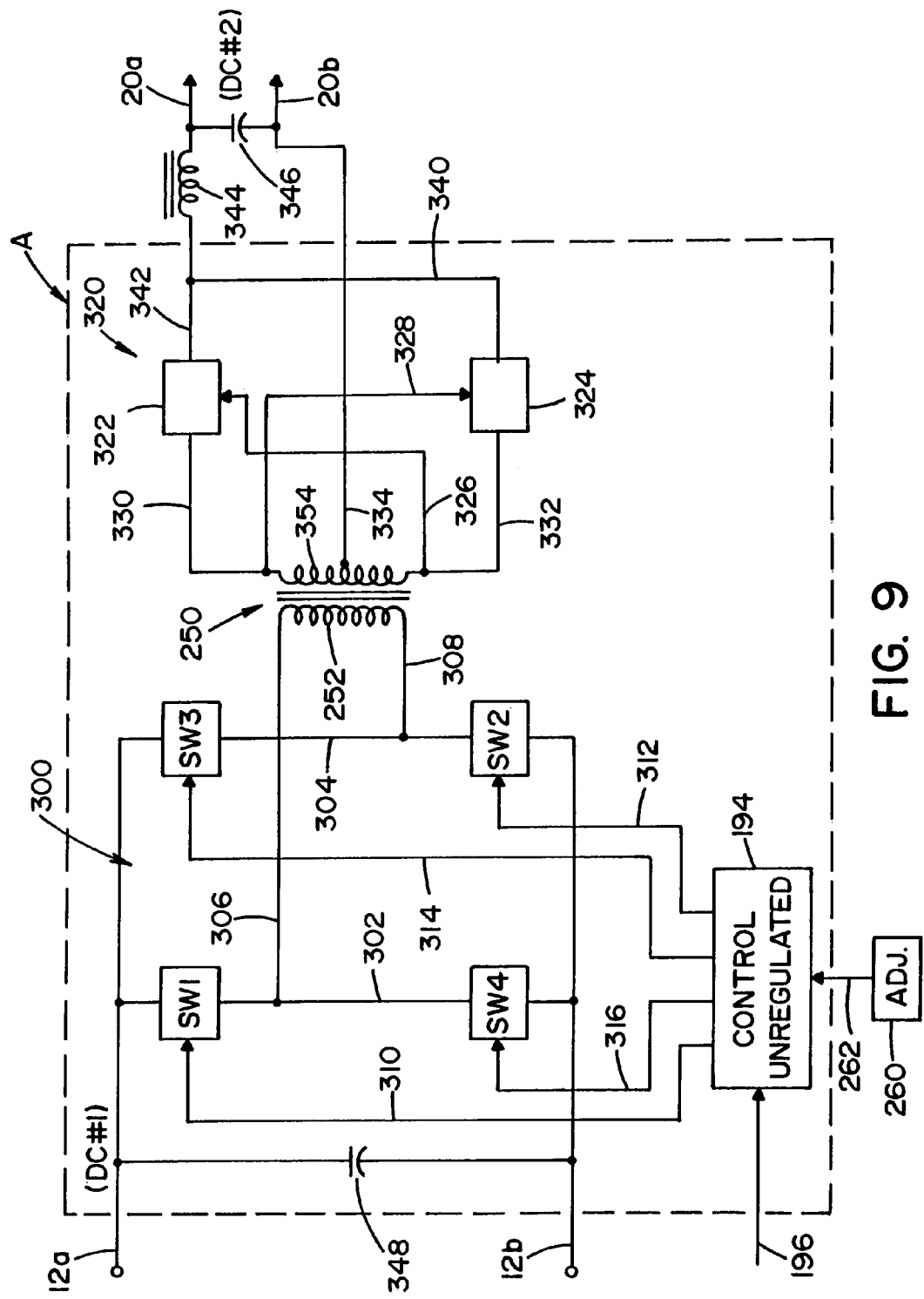
FIG. 9 is a schematic diagram illustrating further details of an exemplary unregulated isolated second stage inverter of a power source according to the invention.

Referring now to FIGS. 8 and 9, FIG. 8 shows another implementation of the present invention with more specific details on the preferred three stage embodiment of the present invention, wherein a three stage power source PS7 is illustrated, similar to power source PS6 with like components having the same identification numbers. In accordance with an aspect of the invention, the output stage III includes a multiphase interleaved switching converter or chopper 30 for providing a regulated signal output (e.g., a welding current between electrode E and workpiece W). As shown in FIGS. 7 and 8, a current shunt S provides can be used to provide welding process current feedback signal C to controller 130. The illustrated high switching speed inverter A of stage II in this implementation includes the features and characteristics described above, and additionally provides electrical isolation between the first and second DC output signals DC#1 and DC#2 via an isolation transformer 250 having a primary winding 252 and a secondary winding 254. As further illustrated in FIG. 9, the primary side of DC to DC converter A includes a switching network 300 for directing an alternating current to primary winding 252. The rectified output from secondary 254 is the secondary section or side of converter A.

The exemplary converter A of FIGS. 8 and 9 employs a high switching speed inverter that has a duty cycle or phase shift set by the non-regulating controller 194, wherein no process or system feedback is provided to the controller 194 in the illustrated implementations. The second stage switching frequency, moreover, can be relatively high (e.g., higher than the switching speed of the third stage converter 30), such as about 100 kHz in the practical version of this power source PS7. In the exemplary unregulated second stage converter A, the duty cycle and operating frequency remain essentially fixed during the welding operation, although non-feedback type adjustments to the duty cycle and/or frequency of the second stage II can be made as indicated by "ADJ" circuit 260 having an output 262 for adjusting controller 194. In a preferred embodiment of the second stage II, moreover, the duty cycle thereof is close to 100% so that the switch pairs are conductive together their maximum times at the primary side of inverter A, although any suitable switching frequency and duty cycle may be employed within the scope of the invention, wherein circuit 260 or other means can be used to adjust the duty cycle, phase shift, frequency, etc. for the second stage II, in order to adjust the otherwise generally fixed (e.g., unregulated) relationship between the first DC 14 and the second DC 20. Thus, the unregulated, isolation inverter A may be changed to have a different, but fixed duty cycle. In this regard, the duty cycle is preferably close to 100% so that the switch pairs are operated essentially in unison, wherein the duty cycle may be varied between about 80-100% in typical applications of the present invention.

Input stage I normally includes a rectifier 60 followed by a power factor correcting DC to DC converter 62, wherein a suitable rectifier 60 can be provided for single phase AC or three phase AC signals of various magnitudes, represented as input 12. In a preferred implementation, moreover, the boost converter 62 is used for a power factor correcting input stage I to create the first DC output signal DC#1, as shown in FIG. 8. This boost converter 62 is operated in accordance with controller 190 having a control voltage 182 as previously described. In accordance with a slight modification of the preferred embodiment, supply 270 in FIG. 8 has a transformer connected by lines 272 and 274 across one phase of a single phase or three phase AC input 12. A rectifier and filter in power supply 270 produce a low control voltage in optional dashed line 276 for use instead of the control voltage in line 182 if desired. These two alternatives do not affect the operating characteristics of power source PS7. Other such modifications of a three stage power source for electric arc welding can be obtained from the previous description and well known technology in the welding field.

Unregulated inverter A of stage II can use various inverter circuits, one of which is illustrated in greater detail in FIG. 9. The preferred second stage circuit A is divided between a primary section or side defined by the input to primary winding 252 of isolating transformer 250 and a secondary section or side defined by output of secondary winding 254. Referring first to the primary section or side of inverter A, full bridge circuit 300 is employed wherein paired switches SW1-SW3 and SW2-SW4 are across capacitor 348 are connected by leads 302, 304, 306, and 308, although half-bridge circuits or other switching circuits can alternatively be used. The switches SW1-SW4 in the illustrated circuit 300 are energized in alternate sequence by gating pulses on lines 310, 312, 314, and 316, respectively. Controller 194 outputs gating pulses in lines 310-316 and an adjusted duty cycle, frequency (period), and/or phase relationship may be determined by the logic on line 262 from circuit 260 as previously discussed. In one implementation, the duty cycle can be controlled by changing the phase shift of lines 310 and 312 and lines 314 and 316, wherein circuit 260 adjusts the duty cycle or phase shift of the paired switches. This adjustment is fixed during the operation of inverter A. In a preferred implementation, circuit 300 has about 100% duty cycle or phase shift, where each pair of switches has maximum periods of overlapping conduction. Controller 194 has a control voltage from an appropriate supply indicated in FIG. 9 by line 196, as also previously described.

In operation of the exemplary circuit 300 of FIG. 9, an alternating current is directed through primary winding 252 by controlled operation of switches SW1-SW4. This current preferably has an ultra high frequency normally at least about 100 kHz so the components can be reduced in size, weight and cost, wherein such high switching frequency is not dictated by the welding operation, but is selected for efficiency of unregulated stage A of the three stage power source, although the specific frequency of operation for the second stage II is not a requirement of the present invention. The secondary section or side of inverter A includes a rectifier circuit 320 having rectifiers 322, 324, with power inputs 330 and 332, outputs 342 and 340, and control inputs 326 and 328 gated by signals on lines 326, 328, respectively, created at the opposite ends of secondary winding. Leads 326, 328, 330, 332, 340, and 342 form the output leads of rectifier 320 to create a DC voltage (DC#2) across leads 20a, 20b with the output current being smoothed by a choke 344 and the resulting output voltage being applied across an output filter capacitor 346.

In the exemplary three stage power source illustrated in FIGS. 8 and 9, the second stage inverter A is unregulated, which means that it is not adjusted by a real time feedback signal from the welding operation or from the second DC output signal DC#2. Rather, the second stage II converts DC 14 (DC#1) to DC 20 (DC#2) in a relatively fixed manner without feedback regulation. In the illustrated second stage II, the DC to DC conversion provides a substantial reduction in the voltage directed to the regulated third stage 30 of the power source using inverter A, through appropriate selection of the transformer turns ratio. In one example, the turns ratio of transformer 250 is about 4:1, wherein the fixed voltage on output 20 is about ¼ the fixed voltage on output 14 of the first stage, although any turns ratio can be used within the scope of the present invention. Several advantages of an unregulated stage are contained in an article entitled "The incredible Shrinking (Unregulated) Power Supply" by Dr. Ray Ridley incorporated by reference herein as background information. A basic advantage is the ability to increase the frequency to above 100 kHz to reduce the size and cost of the second stage II.

Referring now to FIGS. 10A-12B, an aspect of the present invention involves the use of an interleaved multiphase switching converter 30 as the final (third) stage of the three stage welding power source. In this aspect of the invention, the third power source stage III comprises a plurality of converter power circuits to convert the second DC output signal DC#2 to a regulated signal suitable for a welding, cutting, or other arc process, wherein the various aspects of the third stage III are hereinafter exemplified in several illustrative embodiments of a four-phase buck type switching DC to DC converter 30 having individual converter power circuits 30a, 30b, 30c, and 30d coupled in parallel between the second DC output signal DC#2 and the welding operation to provide the process output signal. However, it will be appreciated that any number N converter power circuits may be employed in a multiphase third stage converter within the scope of the invention, wherein N can be any positive integer greater than 1. In addition, any converter power circuit type may be used, wherein the invention is not limited to buck converter power circuit architectures. Moreover, the exemplary third stage converter power circuits 30a-30d are operated out of phase relative to one another as shown in FIG. 1 below, although this particular form of converter power circuit control illustrated herein is not a strict requirement of the invention.

Figure 10A:
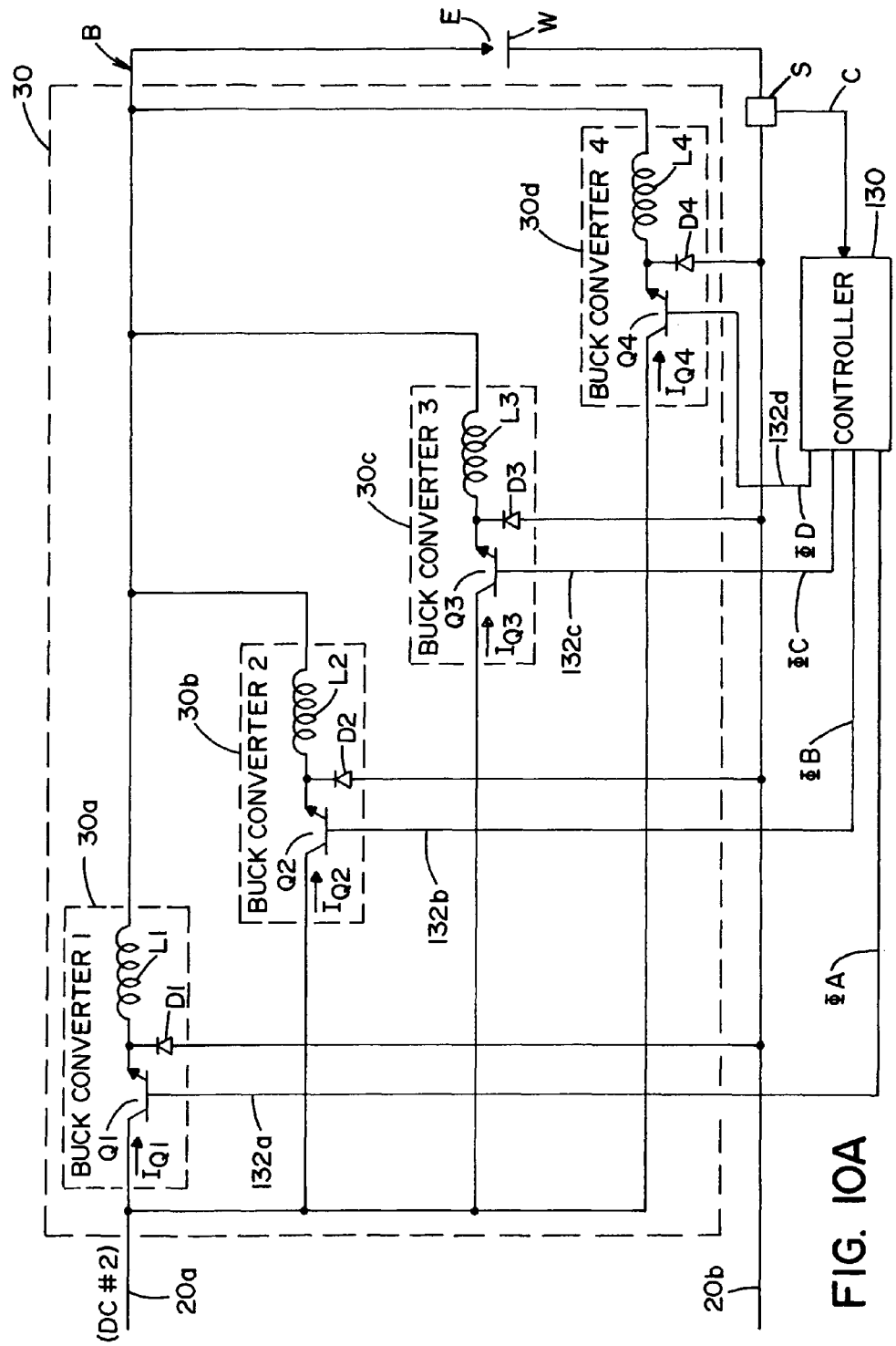
FIG. 10A is a schematic diagram illustrating an exemplary interleaved multiphase DC to DC third stage converter having four parallel connected buck converter power circuits for creating a welding process output signal in a three stage power source according to the invention.
Figure 10B:
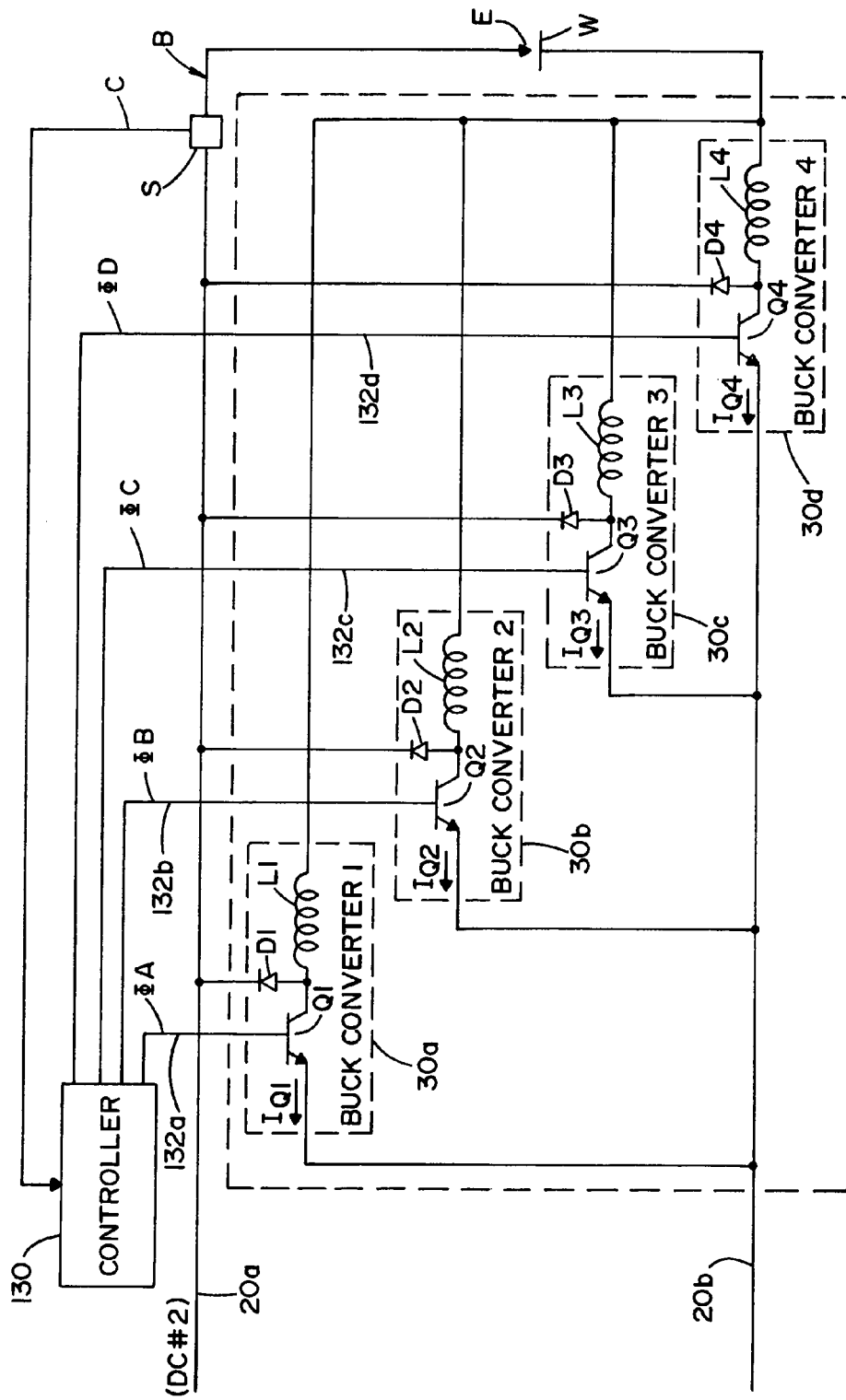
FIG. 10B is a schematic diagram illustrating another exemplary four-phase interleaved buck converter for supplying a regulated signal in accordance with the invention.

FIG. 10A illustrates an implementation of the multiphase interleaved third stage converter 30 configured in a high side buck type architecture in which the individual switching elements and output chokes of the converter power circuits 30a-30d are coupled between the positive second DC output signal line 20a and the welding electrode E (process output B) with a current shunt feedback sensor S in the negative (workpiece) return path. An alternative four-phase buck converter implementation is shown in FIG. 10B, wherein the converter phase switches and inductor chokes are in a negative return path between the workpiece W and the negative second DC output signal line 20b. In each of these examples, the converter power circuits 30a-30d individually comprise a switching device Q, such as bipolar transistor (e.g., IGBT, etc.), MOSFET, or other switching element, along with a rectifier D and an inductor or choke L, wherein these components are arranged in a buck type converter power circuit configuration. Alternatively, the converter power circuit components may be configured differently, for example, to achieve boost, buck-boost, or other converter type architectures, and the converter power circuits may alternatively comprise more or fewer components than the exemplary buck converter power circuits of the illustrated embodiments, wherein all such variant implementations which provide multiphase DC to DC conversion to provide a regulated signal suitable for an arc process in a third stage of a welding power source are contemplated as falling within the scope of the invention and the appended claims.

As shown in FIG. 10A, one possible multiphase converter 30 comprises four such buck converter power circuits 30a-30d. The first converter power circuit 30a includes a switching device Q1 coupled between the positive line 20a of the second DC output signal DC#2 and an internal buck converter power circuit node, wherein Q1 is a bipolar transistor having a collector coupled to line 20a, an emitter coupled with the converter power circuit internal node, and a control terminal (base or gate) coupled to receive a first converter power circuit control signal 132a (ΦA) from the controller 130. The first buck converter power circuit 30a further comprises a rectifier (freewheeling diode) D1 having an anode coupled to the negative line 20b of the second DC output signal DC#2 and a cathode coupled to the emitter of Q1 (the internal node), as well as a converter power circuit inductor L1 coupled between the internal node and the regulated signal. The other three buck converter power circuits 30b-30d are similarly constructed, with corresponding switching devices Q2-Q4, diodes D2-D4, and inductors L2-L4, respectively. As shown in FIG. 10A, the converter power circuit switching devices Q1-Q4 are all coupled between the input terminal 20a and the corresponding internal power circuit nodes, and the inductors L1-L4 are all coupled to the welding electrode via the regulated signal line B, where the controller 130 provides corresponding power circuit control signals ΦA-ΦD to the switches Q1-Q4 of the converter power circuits 30a-30d.

Figure 11:
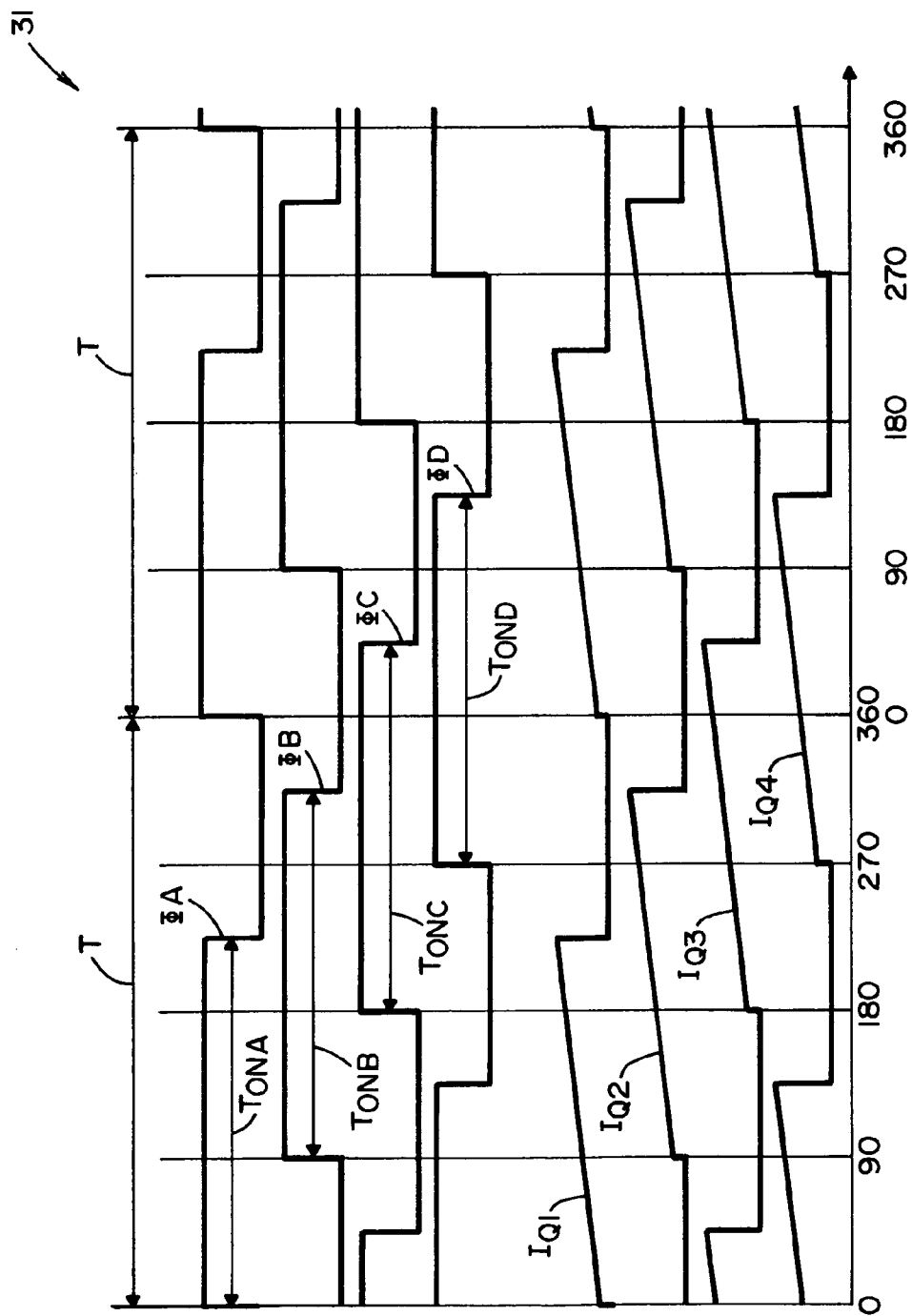
FIG. 11 is a waveform diagram illustrating exemplary multiphase control signals in the interleaved converters of FIGS. 10A and 10B.

Referring also to FIG. 11, the third stage controller 130 provides the control signals 132a-132d such that the individual converter power circuits 30a-30d are pulse width modulated according to feedback signal C from the current shunt S, and each converter power circuit 30a-30d is active for a corresponding active portion having duration of a switching period T of the multiphase converter 30. Moreover, the converter power circuits 30a-30d are controlled in interleaved fashion, wherein the controller 130 provides the switching control signals 132a-132d such that the buck converter power circuits 30a-30d are operated out of phase relative to one another. Any phase relationship is contemplated within the scope of the invention, including 0 degrees (e.g., in-phase), wherein the exemplary implementations illustrated and described herein provide for a relative phase angle that is related to the number N of converter power circuits 30a-30d (e.g., four in the illustrated examples). Moreover, the converter power circuits in one aspect of the invention are operated such that at least two are concurrently operating during at least a portion of each switching cycle, whereby some or all of the circuits operated with temporal overlap for certain values of pulse width. In this regard, the illustrated example of FIG. 11 shows 90 degree phase angle between the successive converter power circuits, with the switching periods overlapping one another.

A timing or waveform diagram 31 in FIG. 11 illustrates exemplary power circuit switching control signals 132a-132d (indicated as transistor control voltages ΦA-ΦD for two exemplary switching periods of the interleaved four-phase converter 30, wherein each converter switching period has a time duration T and the individual power circuits are active (e.g., pulse width modulated) in corresponding portions also of duration T, wherein the active portions are phase shifted by an angle that is 360 degrees/N. FIG. 11 also illustrates the corresponding converter power circuit switching device currents $I_{Q1}$-$I_{Q4}$. In the exemplary four-phase converters 30 illustrated and described herein, each switching cycle or period T of the converter 30 includes 360 degrees, wherein the active portion T for each converter power circuit 30a-30d begins at a multiple of the 90 degree phase angle. Other relative phase relationships are possible within the scope of the invention, including in-phase operation. In general, the interleaved multiphase converters of the invention may include any number N converter power circuits, where N is an integer greater than 1, and wherein the phase angles may vary from 0 to 360 degrees.

As shown in the timing diagram 31 of FIG. 11, the individual buck converter power circuits operate in normal buck converter fashion, with the controller 130 providing the control signals 132a-132d in interleaved phase-shifted fashion to generate the regulated process output signal to the welding electrode E on line B. With respect to the first converter power circuit 30a, for example, when the first converter power circuit switch Q1 is conducting (Q1 turned ON by control signal 132a (ΦA), with a positive switch current $I_{Q1}$ flowing through switch Q1), the internal node rises to the voltage at line 20a, and the current through inductor L1 ramps up in a generally linear fashion to provide welding current to the electrode E via line B. When Q1 is turned off, the switch current $I_{Q1}$ ceases, the inductor current continues to flow, wherein the internal node voltage drops and the freewheeling diode D1 becomes forward biased and begins to conduct. In the four-phase example, the pulse width modulation of the first converter power circuit 30a begins at zero degrees of each designated switching period T, wherein the controller 130 provides the first control signal 132a (ΦA) having a given on time $T_{ONA}$, wherein the ratio of the on time $T_{ONA}$ to the switching period T corresponds to a PWM duty cycle determined by the controller 130 based on comparison of the sensed welding process current and a desired welding current (e.g., according to waveform control as shown in FIG. 5 above), or according to any other suitable control strategy employing feedback, feed forward, or other algorithm or control scheme. The other converter power circuits 30b-30d are similarly controlled by signals 132b-132d from controller 130 in this example, with the respective on-times $T_{ONB}$-$T_{OND}$ being also determined according to the feedback and waveform control strategy, and with the active portions beginning in successively phase-shifted fashion, with the period T for the second circuit 30b starting at 90 degrees, and that of circuits 30c and 30d starting at 180 and 270 degrees, respectively. In this manner, each converter power circuit contributes current to the welding operation during the corresponding portion of each welding period T, wherein the currents thereof are additive at the output. It is noted in this regard, that the output voltage is essentially unrelated to the number N of converter power circuits. In other possible implementations, the active time portions of each power circuit need not be equal, and the power circuits need not be controlled according to the same strategy. Moreover, although the exemplary controller 130 employs pulse width modulation techniques, other modulation can be employed, such as pulse frequency modulation, etc., wherein all such alternative implementations are contemplated as falling within the scope of the invention and the appended claims.

Referring also to FIG. 10B, an alternative four-phase buck-type interleaved converter 30 is illustrated, in which the converter power circuits 30a-30d individually comprise a switching device Q1-Q4 coupled between the second DC output signal and an internal power circuit node. The switching devices Q1-Q4 are coupled to the negative line 20b of the second DC output signal DC#2 in the configuration of FIG. 10B, and the power circuit inductors L1-L4 are coupled between the corresponding buck converter power circuit internal nodes and the regulated signal at the workpiece W, wherein a current shunt S is provided in the positive path at line B to generate the feedback on line C. In this embodiment, the freewheeling diodes D1-D4 of the converter power circuits 30a-30d are coupled with an anode at the power circuit internal nodes and a cathode coupled to the positive DC line 20a. In this case, the control signals 132a-132d are provided as shown in the timing diagram 31 of FIG. 11 as in the above described example for interleaved pulse width modulation of the converter power circuits 30a-30d. When Q1 is on (e.g., $T_{ONA}$), the first power circuit internal node is at the voltage of line 20b and current $I_{Q1}$ flows from the first inductor L1 to the negative DC line 20b. As the switch Q1 is turned off, the inductor current continues to flow through the freewheeling diode D1 to the line 20a and hence to the welding process electrode E. As discussed above, other particular power circuit types and designs may be substituted for the exemplary buck converter power circuits 30 of FIGS. 10-A and 10B within the scope of the invention.

It is noted that the use of multiple power circuits 30a-30d in the switching converter 30 of the third stage III provides several advantages over non-multiphase approaches. One particular advantage is reduced ripple current. In this regard, the converter power circuits 30a-30d are similarly constructed, each of which having a converter power circuit ripple current rating Ipr, wherein the interleaved multiphase switching converter 30 has a converter ripple current rating Icr which is less than the rating Ipr of the individual power circuits. This reduction in the ripple current results from the multiphase architecture, and allows reduction in the size and values of the converter power circuit inductors L1-L4, thereby saving space and cost. This reduction, for example, may offset the increased component count necessitated by the multiphase design. Furthermore, the reduced inductor size may facilitate the use of board mounted chokes instead of larger chokes found in single phase converters. Moreover, the reduced values of the inductors can improve the transient response of the output stage III, thereby facilitating advanced welding process control strategies (e.g., waveform control, etc.).

In addition, the individual power circuits 30a-30d can be designed for a given maximum current rating with the number of power circuits in a given power source design being determined by the desired converter current output, whereby different welding or plasma cutting systems can be designed using different numbers of modular chopper power circuits. Furthermore, since the currents provided by the individual power circuits are relatively low, high efficiency and low current stresses can be achieved, while providing potentially unlimited bandwidth for advanced welding techniques. Unlike prior attempts at multiphase welding power sources, such as Reynolds U.S. Pat. No. 6,051,804 and U.S. Pat. No. 6,300,589, the three stage welding power sources of the present invention are operable at virtually any current amperage where the individual converter power circuit modules can be designed for operation at typical welding voltage levels, where the welder output voltage is essentially unrelated to the number N of output stage converter power circuits. In this regard, the interleaved multiphase switching converters (e.g., converter 30) of the invention comprises N converter power circuits (e.g., power circuits 30a-30d) coupled in parallel to receive the second DC output signal (DC#2) where the power circuits individually have a converter power circuit maximum current rating Ip, and wherein the interleaved multiphase switching converter has a converter maximum current rating of about N×Ip. For example, if buck converter power circuit 30a is designed for operation at a maximum power circuit current Ip of 50 amperes, a 300 ampere multiphase converter could be constructed using six such converter power circuits coupled in parallel to convert power from the second DC output signal DC#2 to a welding regulated signal, wherein each converter power circuit could be operated at a 60 degree relative phase relationship for a switching period duration T.

Figure 12:
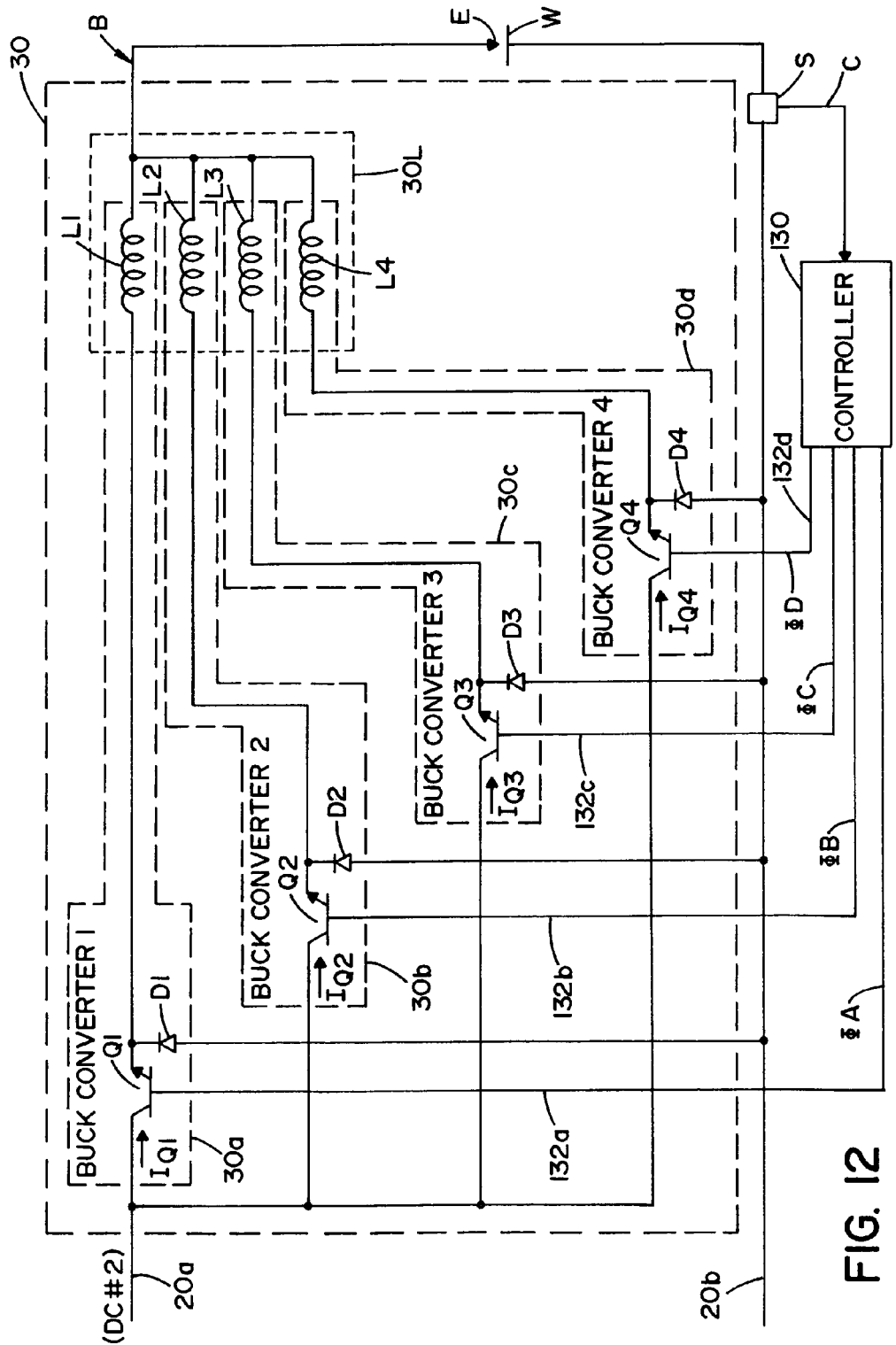
FIG. 12 is a schematic diagram illustrating another implementation of an interleaved multiphase buck converter output stage in which the converter power circuit inductors are integrally would around a common core in accordance with the invention.
Figure 12A:
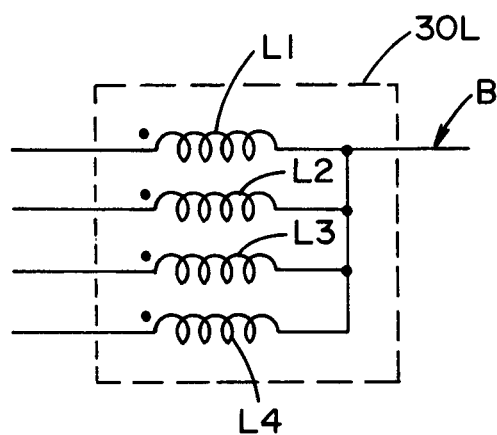
FIGS. 12A and 12B are schematic diagrams illustrating two alternate winding orientations for integrated converter power circuit inductors would around a common core in accordance with the invention.
Figure 12B:
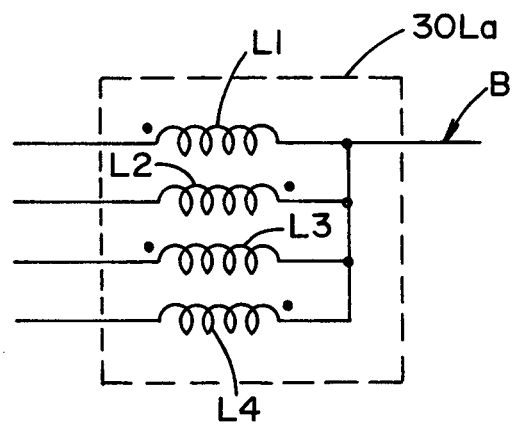

Referring now to FIGS. 12-12B, another aspect of the invention provides a three stage power source with a first stage converting an input AC signal to provide a first DC output, a second stage to convert the first DC output signal into a second DC output signal, and an interleaved multiphase third stage for converting the second DC output signal to a regulated signal, wherein the multiphase converter comprises a plurality of converter power circuits individually having an inductor and a switching device, wherein at least two of the inductors are wound on a common core. FIG. 12 illustrates the exemplary multiphase buck converter 30 having four converter power circuits 30a-30d, where the power circuit components are interconnected in a buck type converter arrangement similar and electrically equivalent to that illustrated in FIG. 10A above. In the implementation of FIG. 12, however, the power circuit inductors L1-L4 are integrated with one another using a common core, to form an integrated magnetic component or unitary converter inductor structure 30L. Other embodiments of this aspect of the invention are possible wherein less than all of the inductors are combined on a single core. The inductors L1-L4 each include a corresponding winding, where two or more of the windings of the inductors L1-L4 may be wound around a common core, which may be any suitable form or material, such as E-I, E-E or other core structures as are known. The integration of two or more of the converter power circuit inductors L1-L4 may allow for further system size and cost reduction in the three stage power source architectures of the invention.

In constructing an integrated converter structure in the multiphase output stage of the invention, the relative orientations of the inductor windings may be aligned as shown in FIG. 12A, or may be alternated or staggered as shown in an alternate embodiment 30La in FIG. 12B. In this regard, the selection of a particular core design and the relative winding orientation in a given design can be varied to selectively provide for alternate or inverse couplings, wherein the individual power circuit inductors thus integrated may be coupled or decoupled, as taught in Zumel "Magnetic Integration for Interleaved Converters". Integration of decoupled inductors L1-L4 itself may advantageously provide reduction in total component size, as well as lowered losses and cost. Magnetic coupling of some or all of the inductors L1-L4 allows energy from one inductor to be transferred to another coupled inductor, wherein output filtering requirements may be reduced. Thus, for example, a decoupled alternate integration could be provided with staggered windings in the integrated magnetic component 30La (FIG. 12B), in which the common core may be constructed with the integrated windings being wound around parallel gapped magnetic core legs, wherein one or more additional ungapped legs are provided to magnetically decouple the inductors from one another. In another possible implementation (FIG. 12A), the windings of the integrated inductors L1-L4 are wound around gapped or ungapped legs of a core structure without additional decoupling legs, whereby the integrated inductors are magnetically coupled. Thus, whereas the multiphase output stage conversion aspects of the invention can facilitate the above mentioned advantages of improved dynamic response and higher bandwidths generally, selective integration of two or more converter power circuit inductors may provide further benefits, particularly where a relatively large number of converter power circuits are used (e.g., high values of N).

While the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

Having thus described the invention, the following is claimed:

1. A three stage power source for an electric arc welding or cutting process having a topology with each stage of the topology defined by an input and an output signal, said power source comprising:

a first stage receiving an AC input signal and providing as an output a first fixed DC signal;

an unregulated second stage coupled with said first stage to receive said first fixed DC signal, said second stage converting said first fixed DC signal into a second fixed DC signal as an output signal of the second stage;

a third stage coupled with said second stage to receive said second fixed DC signal, said third stage comprising an interleaved multiphase switching converter comprising a plurality of parallel converter power circuits to convert, separate and distinct of said first and second stages, said second fixed DC signal to a regulated signal suitable for welding, with each of said power circuits having a switching device with a control input; and a controller for creating a control input signal at a different phase angle for each said parallel converter power circuit.

2. The three stage power source as defined in claim 1, wherein said interleaved multiphase switching converter is a multiphase buck converter comprising a plurality of buck converter power circuits.

3. The three stage power source as defined in claim 2, wherein said switching device of each power circuit is coupled between said second fixed DC signal and a corresponding buck converter power circuit internal node, and wherein said buck converter power circuits individually comprise a rectifier coupled between said second fixed DC signal and said buck converter power circuit internal node, and an inductor coupled between said buck converter power circuit internal node and said regulated signal.

4. The three stage power source as defined in claim 2, wherein said interleaved multiphase switching converter comprises N converter power circuits coupled in parallel to receive said second fixed DC signal, N being an integer greater than 1, wherein said converter power circuits individually have a converter power circuit maximum current rating Ip, and wherein said interleaved multiphase switching converter has a converter maximum current rating of about N×Ip.

5. The three stage power source as defined in claim 2, wherein said third stage provides said regulated signal having a voltage substantially independent of the number of converter power circuits of said interleaved multiphase switching converter.

6. The three stage power source as defined in claim 1, wherein said multiphase switching converter comprises N converter power circuits, N being an integer greater than 1, and wherein said phase angle is 360°/N.

7. The three stage power source as defined in claim 6, wherein said interleaved multiphase switching converter comprises N converter power circuits coupled in parallel to receive said second fixed DC signal, N being an integer greater than 1, wherein said converter power circuits individually have a converter power circuit maximum current rating Ip, and wherein said interleaved multiphase switching converter has a converter maximum current rating of about N×Ip.

8. The three stage power source as defined in claim 6, wherein said third stage provides said regulated signal having a voltage substantially independent of the number of converter power circuits of said interleaved multiphase switching converter.

9. The three stage power source as defined in claim 1, wherein said converter power circuits individually have a converter power circuit ripple current rating Ipr, and wherein said interleaved multiphase switching converter has a converter ripple current rating Icr which is less than Ipr.

10. The three stage power source as defined in claim 9, wherein said interleaved multiphase switching converter comprises N converter power circuits coupled in parallel to receive said second fixed DC signal, N being an integer greater than 1, wherein said converter power circuits individually have a converter power circuit maximum current rating Ip, and wherein said interleaved multiphase switching converter has a converter maximum current rating of about N×Ip.

11. The three stage power source as defined in claim 9, wherein said third stage provides said regulated signal having a voltage substantially independent of the number of converter power circuits of said interleaved multiphase switching converter.

12. The three stage power source as defined in claim 1, wherein said second stage comprising an unregulated DC to DC converter having an input coupled with said first stage to receive said first fixed DC output signal, a network of switches to convert said first fixed DC signal into a first internal AC signal, an isolation transformer with a primary winding driven by said first internal AC signal and a secondary winding for creating a second internal AC signal, and a rectifier coupled with said secondary winding to convert said second internal AC signal into said second fixed DC signal.

13. The three stage power source as defined in claim 12, wherein said interleaved multiphase switching converter comprises N converter power circuits coupled in parallel to receive said second fixed DC signal, N being an integer greater than 1, wherein said converter power circuits individually have a converter power circuit maximum current rating Ip, and wherein said interleaved multiphase switching converter has a converter maximum current rating of about N×Ip.

14. The three stage power source as defined in claim 12, wherein said third stage provides said regulated signal having a voltage substantially independent of the number of converter power circuits of said interleaved multiphase switching converter.

15. The three stage power source as defined in claim 1, wherein said individual converter power circuits further comprise an inductor, and wherein said inductors of at least two of said converter power circuits are integrally wound on a common core.

16. The three stage power source as defined in claim 15, wherein said interleaved multiphase switching converter comprises N converter power circuits coupled in parallel to receive said second fixed DC signal, N being an integer greater than 1, wherein said converter power circuits individually have a converter power circuit maximum current rating Ip, and wherein said interleaved multiphase switching converter has a converter maximum current rating of about N×Ip.

17. The three stage power source as defined in claim 15, wherein said third stage provides said regulated signal having a voltage substantially independent of the number of converter power circuits of said interleaved multiphase switching converter.

18. The three stage power source as defined in claim 1, wherein said interleaved multiphase switching converter comprises N converter power circuits coupled in parallel to receive said second fixed DC output signal, N being an integer greater than 1, wherein said converter power circuits individually have a converter power circuit maximum current rating Ip, and wherein said interleaved multiphase switching converter has a converter maximum current rating of about N×Ip.

19. The three stage power source as defined in claim 18, wherein said third stage provides said regulated signal having a voltage substantially independent of the number of converter power circuits of said interleaved multiphase switching converter.

20. The three stage power source as defined in claim 1, wherein said third stage provides said regulated signal having a voltage substantially independent of the number of converter power circuits of said interleaved multiphase switching converter.

21. The three stage power source as defined in claim 1, wherein said multiphase switching converter comprises N converter power circuits, N being an integer greater than 1, wherein said phase angle is 360°/N, wherein said controller provides said control input signals to operate said interleaved multiphase switching converter at a switching frequency with a corresponding converter switching period T, wherein said converter power circuits are individually pulse width modulated to selectively provide power from said second fixed DC signal to said regulated signal during a corresponding power circuit portion of time of length T, wherein said power circuit portions are phase shifted by said phase angle with temporal overlap of at least two of said power circuit portions.

22. A power source for an electric arc welding or cutting process having a topology with each stage of the topology defines by an input and an output signal, said power source comprising:

A first stage providing a first fixed DC output signal;
an unregulated second stage providing a second fixed DC output signal that is fixed and different with respect to said first fixed DC signal;
a third stage having an interleaved multiphase switching converter comprising a plurality of parallel converter power circuits to convert a separate and distinct of said first and second stages, said second fixed DC output signal to a regulated signal suitable for welding, with each of said power circuits having a switching device with a control input; and a controller for creating a control input signal at a different phase angle for each said parallel converter power circuit, wherein said power circuits are operated in phase shifted fashion relative to one another with temporal operational overlap of at least two of said power circuits, said multiphase switching converter comprises N converter power circuits, N being an integer greater than 1, wherein said phase angle is 360°/N.

23. The power source as defined in claim 22, wherein said controller provides said control input signals to operate said interleaved multiphase switching converter at a switching frequency with a corresponding converter switching period T, wherein said converter power circuits are individually pulse width modulated to selectively provide power from said second fixed DC signal to said regulated signal during a corresponding power circuit portion of time of length T, wherein said power circuit portions are phase shifted by said phase angle with temporal overlap of at least two of said power circuit portions.

24. The power source as defined in claim 22, wherein said interleaved multiphase switching converter is a multiphase buck converter comprising a plurality of buck converter power circuits.

25. The power source as defined in claim 22, wherein said converter power circuits individually have a converter power circuit ripple current rating Ipr, and wherein said interleaved multiphase switching converter has a converter ripple current rating Icr which is less than Ipr.

26. The power source as defined in claim 22, wherein said individual converter power circuits further comprise an inductor, and wherein said inductors of at least two of said converter power circuits are integrally wound on a common core.

27. The power source as defined in claim 22, wherein said N converter power circuits coupled in parallel to receive said second fixed DC signal, wherein said converter power circuits individually have a converter power circuit maximum current rating Ip, and wherein said interleaved multiphase switching converter has a converter maximum current rating of about N×Ip.

28. The power source as defined in claim 22, wherein said interleaved multiphase switching converter provides said regulated signal having a voltage substantially independent of the number of converter power circuits.

29. A three stage power source for an electric arc welding or cutting process having a topology with each stage of the topology defined by an input and an output signal, said power source comprising:

a first stage receiving an AC input signal and providing as an output first fixed DC signal;

an unregulated second stage coupled with said first stage to convert said first fixed DC signal into another output, a second fixed DC signal less than said first fixed DC signal;

a third stage comprising an interleaved multiphase switching converter coupled with said second stage to convert, separate and distinct of said first and second stages, said second fixed DC signal to a regulated signal suitable for welding, said interleaved multiphase switching converter comprising a plurality of converter power circuits, said converter power circuits individually comprising an inductor and a switching device with a control input, wherein at least two of said inductors are wound on a common core; and a controller for creating a control input signal at a different phase angle for each said converter power circuit.

30. The three stage power source as defined in claim 29, wherein said interleaved multiphase switching converter is a multiphase buck converter and wherein said converter power circuits are buck converter power circuits.

31. The three stage power source as defined in claim 30, wherein said switching device of each power circuit is coupled between said second fixed DC signal and a corresponding converter power circuit internal node, and wherein said converter power circuits individually comprise a rectifier coupled between said second fixed DC signal and said converter power circuit internal node, and an inductor coupled between said converter power circuit internal node and said regulated signal.

32. The three stage power source as defined in claim 30, wherein said interleaved multiphase switching converter comprises N converter power circuits coupled in parallel to receive said second fixed DC signal, N being an integer greater than 1, wherein said converter power circuits individually have a converter power circuit maximum current rating Ip, and wherein said interleaved multiphase switching converter has a converter maximum current rating of about N×Ip.

33. The three stage power source as defined in claim 29, wherein said interleaved multiphase switching converter comprises N converter power circuits, N being an integer greater than 1, and wherein said phase angle is 360°/N.

34. The three stage power source as defined in claim 29, wherein said converter power circuits individually have a converter power circuit ripple current rating Ipr, and wherein said interleaved multiphase switching converter has a converter ripple current rating Icr which is less than Ipr.

35. The three stage power source as defined in claim 34, wherein said interleaved multiphase switching converter comprises N converter power circuits coupled in parallel to receive said second fixed DC signal, N being an integer greater than 1, wherein said converter power circuits individually have a converter power circuit maximum current rating Ip, and wherein said interleaved multiphase switching converter has a converter maximum current rating of about N×Ip.

36. The three stage power source as defined in claim 29, wherein said power circuits are operated in phase shifted fashion relative to one another with temporal operational overlap of at least two of said power circuits.

37. The three stage power source as defined in claim 36, wherein said interleaved multiphase switching converter comprises N converter power circuits coupled in parallel to receive said second fixed DC signal, N being an integer greater than 1, wherein said converter power circuits individually have a converter power circuit maximum current rating Ip, and wherein said interleaved multiphase switching converter has a converter maximum current rating of about N×Ip.

38. The three stage power source as defined in claim 33, wherein said interleaved multiphase switching converter comprises N converter power circuits coupled in parallel to receive said second fixed DC signal, N being an integer greater than 1, wherein said converter power circuits individually have a converter power circuit maximum current rating Ip, and wherein said interleaved multiphase switching converter has a converter maximum current rating of about N×Ip.

39. The three stage power source as defined in claim 29, wherein said interleaved multiphase switching converter comprises N converter power circuits coupled in parallel to receive said second fixed DC signal, N being an integer greater than 1, wherein said converter power circuits individually have a converter power circuit maximum current rating Ip, and wherein said interleaved multiphase switching converter has a converter maximum current rating of about N×Ip.

40. A power source for an electric arc welding or cutting process having a topology with each stage of the topology defined by an input and an output signal, said power source comprising:
a first stage;
an unregulated second stage having a first fixed DC input signal and
a second fixed DC output signal converted from said first fixed DC signal, said second fixed DC signal being less than said first fixed DC signal;
a third stage having an interleaved multiphase switching converter comprising a plurality of parallel converter power circuits to convert, separate and distinct of said first and second stages, said second fixed DC signal to a regulated signal suitable for welding, each said power circuit having a switching device with a control input; and
a controller for creating a control input signal for each said parallel converter power circuit, wherein said power circuits are operated with temporal overlap of at least two of said power circuits, said controller includes:
a control circuit and
a PWM circuit having a duty cycle, the control circuit including an error amplifier having a first input for a desired process signal and a second input for a sensed process signal from the welding or cutting process, the error amplifier having an output directed to the PWM circuit such that the PWM circuit generates the control input signal to each of said power circuits to define an on time corresponding to the duty cycle of the PWM circuit.

41. The power source as defined in claim 40, wherein said interleaved multiphase switching converter is a multiphase buck converter comprising a plurality of buck converter power circuits.

42. The power source as defined in claim 40, wherein said multiphase switching converter comprises N converter power circuits, N being an integer greater than 1, and wherein said phase angle is 360°/N.

43. The power source as defined in claim 40, wherein said converter power circuits individually have a converter power circuit ripple current rating Ipr, and wherein said interleaved multiphase switching converter has a converter ripple current rating Icr which is less than Ipr.

44. The power source as defined in claim 40, wherein said individual converter power circuits further comprise an inductor, and wherein said inductors of at least two of said converter power circuits are integrally wound on a common core.

45. The power source as defined in claim 40, wherein said interleaved multiphase switching converter comprises N converter power circuits coupled in parallel to receive said second fixed DC signal, N being an integer greater than 1, wherein said converter power circuits individually have a converter power circuit maximum current rating Ip, and wherein said interleaved multiphase switching converter has a converter maximum current rating of about N×Ip.

46. The power source as defined in claim 40, wherein said interleaved multiphase switching converter provides said regulated signal having a voltage substantially independent of the number of converter power circuits.

47. A power source for an electric arc welding or cutting process, said power source comprising:
a first stage DC to DC converter providing a first fixed DC output signal;
an unregulated second stage DC to DC converter for converting said first fixed DC signal to a second fixed DC signal that is less than said first fixed DC signal;
a third stage interleaved multiphase switching converter comprising a plurality of N parallel converter power circuits, N being an integer greater than 1, said interleaved multiphase switching converter being adapted to convert, separate and distinct of said first and second stages, said second fixed DC signal to a regulated signal suitable for welding, said regulated signal having a voltage substantially independent of the number of converter power circuits N, each said power circuit having a switching device with a control input; and
a controller for creating a control input signal at a different phase angle for each said parallel converter power circuit.

48. The power source as defined in claim 47, wherein said phase angle is 360°/N, wherein said controller provides said control input signals to operate said interleaved multiphase switching converter at a switching frequency with a corresponding converter switching period T, wherein said converter power circuits are individually pulse width modulated to selectively provide power from said second fixed DC signal to said regulated signal during a corresponding power circuit portion of time of length T, wherein said power circuit portions are phase shifted by said phase angle with temporal overlap of at least two of said power circuit portions.

49. The power source as defined in claim 47, wherein said interleaved multiphase switching converter is a multiphase buck converter comprising a plurality of buck converter power circuits.

50. The power source as defined in claim 47, wherein said converter power circuits individually have a converter power circuit ripple current rating Ipr, and wherein said interleaved multiphase switching converter has a converter ripple current rating Icr which is less than Ipr.

51. The power source as defined in claim 47, wherein said individual converter power circuits further comprise an inductor, and wherein said inductors of at least two of said converter power circuits are integrally wound on a common core.

52. The power source as defined in claim 47, wherein said converter power circuits individually have a converter power circuit maximum current rating Ip, and wherein said interleaved multiphase switching converter has a converter maximum current rating of about N×Ip.

* * * * *